(12) United States Patent  
Yamazaki et al.

(10) Patent No.: US 7,286,148 B2
(45) Date of Patent: Oct. 23, 2007

(54) LINE HEAD AND IMAGE FORMING APPARATUS INCORPORATING THE SAME

(75) Inventors: Katsunori Yamazaki, Nagano (JP); Kiyoshi Tsujino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 321 days.

(21) Appl. No.: 11/056,947

(22) Filed: Feb. 10, 2005

(65) Prior Publication Data

US 2005/0231580 A1 Oct. 20, 2005

(30) Foreign Application Priority Data

| Feb. 10, 2004 | (JP) | ............................ P2004-032959 |
| Feb. 10, 2004 | (JP) | ............................ P2004-032960 |
| Feb. 19, 2004 | (JP) | ............................ P2004-042632 |

(51) Int. Cl. *B41J 2/45* (2006.01)
(52) U.S. Cl. ........................... 347/130; 347/238
(58) Field of Classification Search ............... 347/130, 347/233, 238
See application file for complete search history.

(56) References Cited

U.S. PATENT DOCUMENTS

| 4,524,372 | A |   | 6/1985 | De Cock et al. |
| 4,782,202 | A | * | 11/1988 | Sawae et al. ................. 219/68 |
| 4,941,004 | A |   | 7/1990 | Pham et al. |
| 5,150,016 | A |   | 9/1992 | Sawase et al. |
| 6,069,644 | A |   | 5/2000 | Tanioka et al. |
| 6,441,560 | B1 |   | 8/2002 | Hunter |
| 6,452,526 | B2 | * | 9/2002 | Sagawa et al. ............. 341/144 |
| 6,611,280 | B1 |   | 8/2003 | Shiraishi et al. |
| 2005/0146593 | A1 | * | 7/2005 | Yamazaki et al. .......... 347/130 |

FOREIGN PATENT DOCUMENTS

| EP | 0 711 995 | 5/1996 |
| JP | 51-65897 | 6/1976 |
| JP | 57-80792 | 5/1982 |
| JP | 58-130508 | 8/1983 |
| JP | 62-208965 | 9/1987 |
| JP | 62-254476 | 11/1987 |
| JP | 64-13166 | 1/1989 |
| JP | 2-111920 | 4/1990 |
| JP | 02-274569 | 11/1990 |
| JP | 04-329159 | 11/1992 |
| JP | 05-309862 | 11/1993 |
| JP | 06-064229 | 3/1994 |
| JP | 7-270751 | 10/1995 |
| JP | 08-300711 | 11/1996 |
| JP | 11-198433 | 7/1999 |
| JP | 11-274569 | 10/1999 |

* cited by examiner

*Primary Examiner*—Huan Tran
(74) *Attorney, Agent, or Firm*—Hogan & Hartson LLP

(57) ABSTRACT

A first power line is adapted to be electrically connected to a power source. A second power line is adapted to be grounded. A plurality of photo emitters are arrayed in a first direction, each of which is electrically connected between the first power line and the second power line by way of a connection line. The photo emitters includes at least one photo emitter provided with a connection line having a resistance different from another.

9 Claims, 26 Drawing Sheets

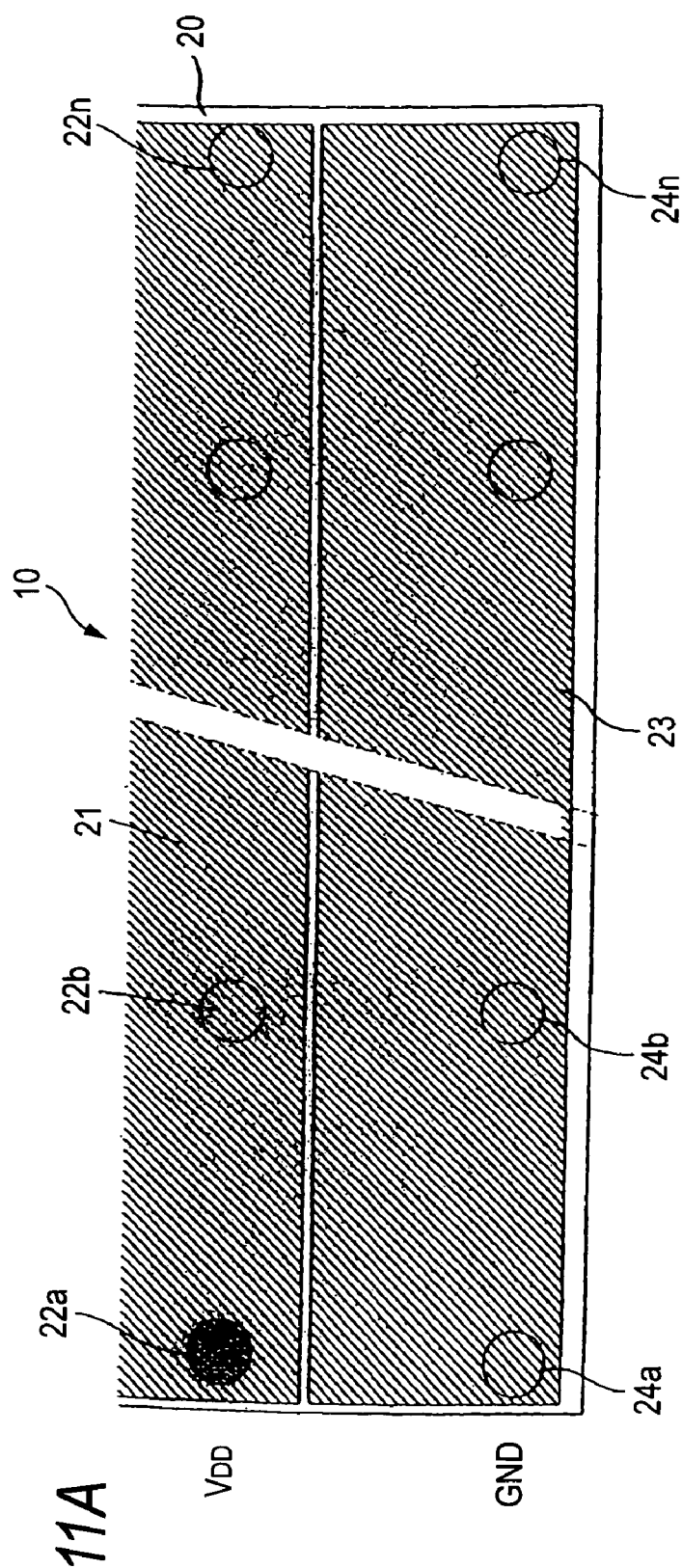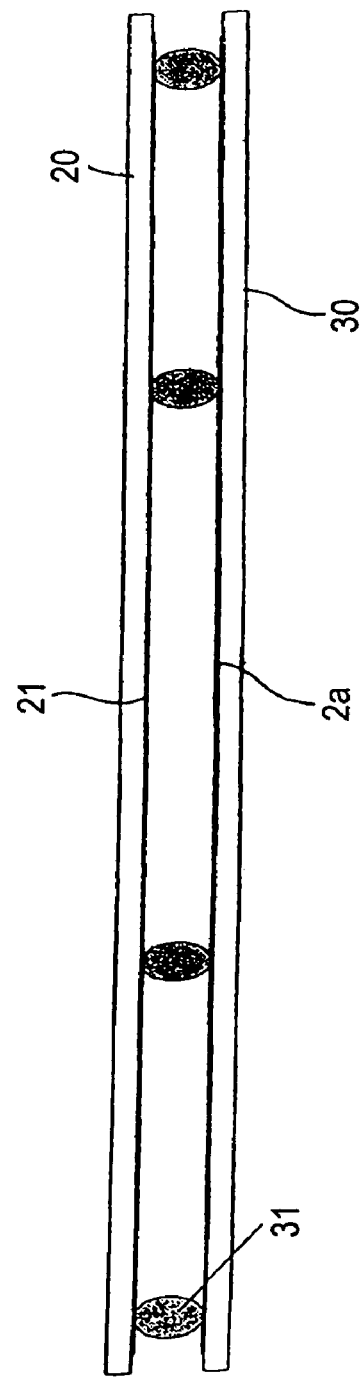

LINE HEAD AND IMAGE FORMING APPARATUS INCORPORATING THE SAME

BACKGROUND OF THE INVENTION

The present invention relates to a line head in which a plurality of photo emitters are arrayed, and an image forming apparatus incorporating the line head.

There has been developed an image forming apparatus using, as an exposer, a line head provided with a large number of photo emitters arrayed. Japanese Patent Publication No. 6-64229A discloses a technique for arraying EL (electroluminescence) elements on an optical printer head and supplying gradation data to each of the EL elements. Moreover, Japanese Patent Publication No. 11-198433A discloses a technique for eliminating inequality in a light emitting characteristic in a primary scanning direction in a printer head in which a plurality of LED chips are arrayed.

As shown in FIG. 32, a large number of organic EL elements Ea are arranged on a line head 10 in a primary scanning direction so that a photo emitter array 1 is formed. First and second power lines 2, 3 formed by thin film wirings. A feeding point 6 is provided on a power supply (VDD) side and a feeding point 7 is provided on a ground (GND) side. "A" denotes an anode electrode of the organic EL element Ea, "K" denotes a cathode electrode thereof, and a lead portion is extended to each of the electrodes.

A drive transistor Tr2 which is formed on the same substrate as the organic EL element Ea. A drain D of the drive transistor Tr2 is connected to the power line 2. A source S of the drive transistor Tr2 is connected to the anode electrode A of the organic EL element Ea through a lead portion. A gate G of the drive transistor Tr2 is connected through a wiring Ga to a source of a control transistor Tr1 which is not shown.

As illustrated in a circuit diagram of FIG. 33, a signal line 4 of a gate and a signal line 5 of a drain are connected to the control transistor Tr1. Each organic EL element Ea arranged in the photo emitter array 1 is connected between the first power line 2 connected to the feeding point 6 on the power supply (VDD) side and the second power line 3 connected to the feeding point 7 on the ground (GND) side.

A photo emitter using the organic EL element is a current driving unit, and a current flowing to the power line (VDD side) on the drain side of the drive transistor Tr2 and the power line (GND side) on the cathode (cathode electrode) side of the photo emitter is increased or decreased depending on the degree of the light emission of the photo emitter. The first and second power lines are fabricated by a thin film wiring. Resistances at both ends of the power lines depend on the size of a printer head and are in order of several W to several tens W.

In a case where all of the photo emitters are activated, the current of the photo emitter is in order of at least ten mA and a voltage to be applied to the photo emitter reaches several tens mV to a hundred mV. In a case where an organic EL element is used as the photo emitter, a current is changed for a slight difference in an applied voltage, that is, the organic EL element has such a property that the amount of light emission is changed greatly.

FIG. 30 shows an example of the arrangement of a control circuit in a case where a photo emitter array is formed in a primary scanning direction as described in the above publications. In this case, feeding points 6a and 6b on the power supply side (VDD) are provided on both sides of the photo emitter array 1. Moreover, feeding points 7a and 7b on the ground side (GND) are also provided on both ends of the photo emitter array 1. The feeding points 6a and 6b on the power supply side are connected to an external power line 17a and the feeding points 7a and 7b on the ground side are connected to an external power line 17b.

The anode electrode A of the organic EL element Ea is connected to the source of the drive transistor Tr2 through a lead portion 27. Moreover, the cathode electrode of the organic EL element Ea is connected to the second power line 3 through a lead portion 28. A control circuit 15 generates a control signal for driving the drive transistor Tr2 and a control transistor which are provided for each photo emitter arranged in the photo emitter array 1. Control signal lines 18a and 18b are connected to the control circuit 15. A moisture-proof plate 20 covers the photo emitter array 1 and the control circuit 15 which are mounted on a substrate 30.

As shown in FIG. 31, the luminance I is varied depending on the position Y in the primary scanning direction in a case where a plurality of organic EL elements (photo emitters) Ea are arrayed and each photo emitter Ea is connected between the first and second power lines 17a, 17b.

The lifetime of the photo emitter is reduced with an increase in the luminance. For this reason, inequality is generated in the lifetime of the photo emitter. When the amount of light emission has inequality, moreover, quality of printing is deteriorated. In the example shown in FIG. 30, thus, there is a problem in that the lifetime of the photo emitter is varied and the quality of printing is deteriorated.

In some cases, the photo emitters are divided into several groups in order to correspond to the formation requirement of various images. Also in such a case, there is a problem in that inequality in the luminances is generated among the respective groups.

Japanese Patent Publication No. 11-274569A discloses an example in which LEDs are arrayed on a printer head and each of the LEDs is divided into m groups each corresponding to n of pixels which are mutually adjacent to each other. The LEDs of each group are collectively connected to a common connection line, so that m of connection lines are provided in total. Further, n of matrix connection lines are provided to selectively operate one of the LEDs in the respective groups. By such a structure, it is possible to increase the intensity of light emission of the LED per constant time.

The above configuration is designed to record character data and gradation data is not supplied to a photo emitter. For this reason, there is a problem in that the formation of an image is restricted and a gradation image cannot be obtained.

SUMMARY OF THE INVENTION

It is therefore an object of the invention to provide a line head capable of reducing inequality of the luminances of photo emitters (photo emitter groups), and obtaining a gradation image.

It is also an object of the invention to provide an image forming apparatus incorporating such a line head.

In order to achieve the above objects, according to the invention, there is provided a line head, comprising:

a first power line, adapted to be electrically connected to a power source;

a second power line, adapted to be grounded; and a plurality of photo emitters, arrayed in a first direction, each of which is electrically connected between the first power line and the second power line by way of a connection line, wherein the photo emitters includes at least one photo emitter provided with a connection line having a resistance different from another.

With this configuration, a current flowing to each of the photo emitters is changed. On the basis of the resistance value of the connection line of the photo emitter having the lowest luminance, the resistance value of the photo emitter having a greater luminance is increased. Consequently, the current flowing to the photo emitter is reduced and the luminance is equalized. By regulating the resistance value of the connection line of each of the photo emitters to have a luminance to be a basis, accordingly, it is possible to correct the variation in the luminance in the primary scanning direction of the line head.

Preferably, the connection line having the different resistance is formed with a cutout portion. In this case, it is possible to correct the variation in the luminance in the primary scanning direction of the line head by a simple processing.

That is, the invention also provides a method of fabricating the above line head, comprising steps of:

operating the photo emitters before the cutout portion is formed;

identifying a photo emitter which emits a light beam having a lowest luminance; and forming the cutout portion such a size that the resistance of the connection line of interest matches with the resistance of the connection line of the identified photo emitter.

Here, it is preferable that the photo emitters form a plurality of groups, and photo emitters belonging to each of the groups are collectively connected to the connection line.

In this case, since the correction of the resistance value is carried out on a group basis, the processing can be more simplified than in a case where the correction is carried out every single photo emitter.

In this case, the invention also provides a method of fabricating the above line head, comprising steps of:

operating the photo emitters before the cutout portion is formed;

identifying a group including photo emitters which emit light beams having a lowest luminance; and forming the cutout portion such a size that the resistance of the connection line of interest matches with the resistance of the connection line of the identified photo emitter.

It is also preferable that: the connection line includes a transparent electrode which is to be opposed to a target to which a light beam emitted from each of the photo emitters is directed; and the cut out portion is formed on the transparent electrode.

Since the transparent electrode has a high resistance, a trimming control can readily be carried out and the cutout portion can easily be processed.

Here, it is further preferable that the cutout portion is rectangular in which each of sides has a dimension which is a multiple of a reference dimension.

In this case, the cutout portion can easily be processed. Moreover, the resistance value of a portion removed for the cutout portion can easily be calculated and a resistance value in a residual portion can be obtained without an error. Consequently, it is possible to correct the resistance value of the connection line with high precision.

Preferably, the connection line having the different resistance has a different width. In this case, a countermeasure can be taken even for a case where the luminance tends to be varied due to manufacturing factors.

Here, it is preferable that the photo emitters form a plurality of groups, and photo emitters belonging to each of the groups are collectively connected to the connection line.

In this case, since the correction of the resistance value is carried out on a group basis, the processing can be more simplified than in a case where the correction is carried out every single photo emitter.

Preferably, the line head further comprises:

a control circuit, operable to generate control signals to be supplied to the photo emitters; and a flexible printed board, extending in the first direction and on which the control circuit and external power lines which are respectively connected to the first power line and the second power line are provided.

With this configuration, the structure of the wiring can be simplified. Moreover, it is possible to reduce the space of the line head. Furthermore, even in a case where the line head is to be curved, an attachment can easily be carried out.

Preferably, the photo emitters are arranged to form a plurality of arrays arranged in a second direction which is perpendicular to the first direction.

In this case, even if the failure of the photo emitter is occurred on one photo emitter array which is operated, it is possible to continuously carry out a print processing without replacing the line head.

Here, it is preferable that the line head further comprises a switcher, which selects at least one of the arrays to be operated.

With this configuration, in a case where a failure is occurred on the operated photo emitter array, it is possible to rapidly take a countermeasure to continuously carry out the light emitting operation. In a case where the switcher is constituted by a switching transistor, moreover, it is possible to quickly change over the photo emitter array with high precision.

Preferably, the line head further comprises:

a first substrate, on which the photo emitters, the first power line and the second power line are provided; and a second substrate, on which a first auxiliary power line and a second auxiliary power line are provided, the second substrate disposed so as to oppose to the first substrate, wherein the first power line and the first auxiliary power line are electrically connected; and the second power line and the second auxiliary power line are electrically connected.

With this configuration, since the feeding point is provided on the second substrate so that the number of the feeding points is increased, it is possible to suppress the influence of a fluctuation in the voltage of the power line for the photo emitter. Accordingly, it is possible to have a structure in which the inequality of the luminances of the arrayed photo emitter is considerably reduced.

Preferably, either organic electroluminescence (EL) elements or light emission diodes (LEDs) serve as the photo emitters.

Since the organic EL element can be controlled statically, a control system can be simplified. With a structure using the LEDs, it is possible to easily manufacture the photo emitter.

According to the invention, there is also provided an image forming apparatus comprising the above line head to form an electrostatic latent image on a photosensitive body.

BRIEF DESCRIPTION OF THE DRAWINGS

The above objects and advantages of the present invention will become more apparent by describing in detail preferred exemplary embodiments thereof with reference to the accompanying drawings, wherein:

FIG. 11A is a plan view of a line head according to a ninth embodiment of the invention;

FIG. 11 B is a side view of the line head of FIG. 11A;

DETAILED DESCRIPTION OF THE INVENTION

Embodiments of the invention will be described below in detail with reference to the accompanying drawings.

Figure 1:
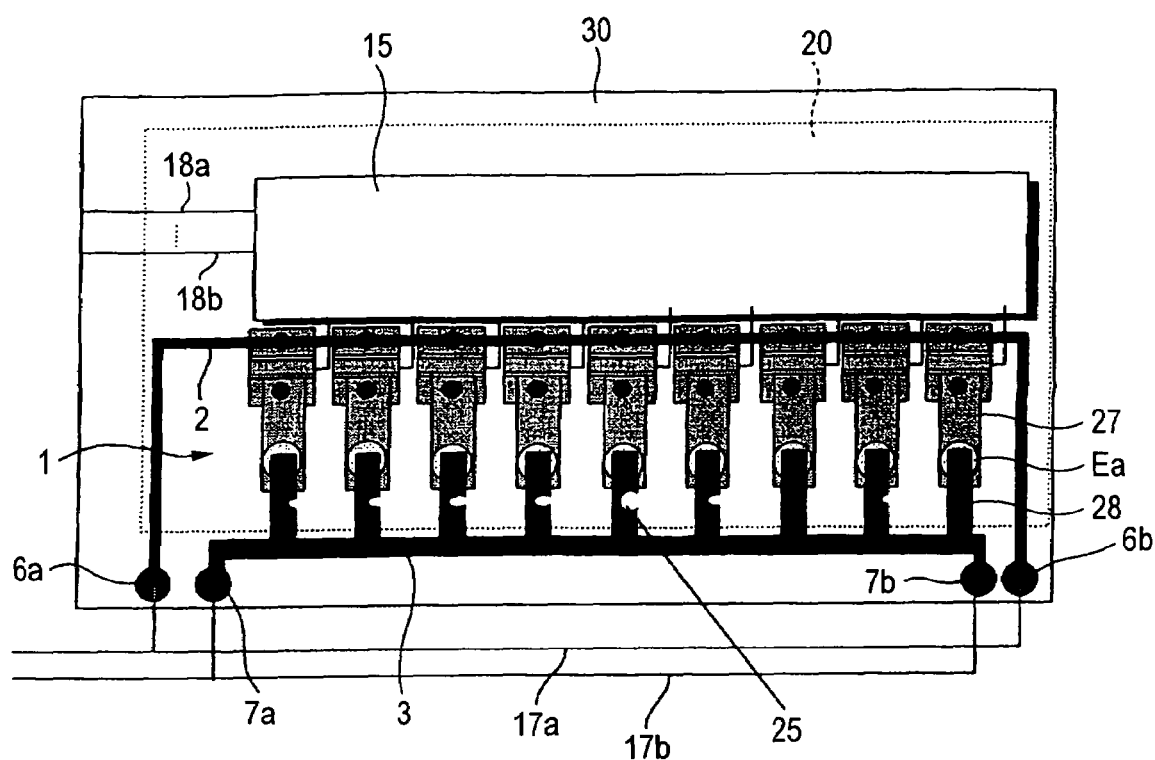
FIG. 1 is a plan view of a line head according to a first embodiment of the invention.
Figure 30:
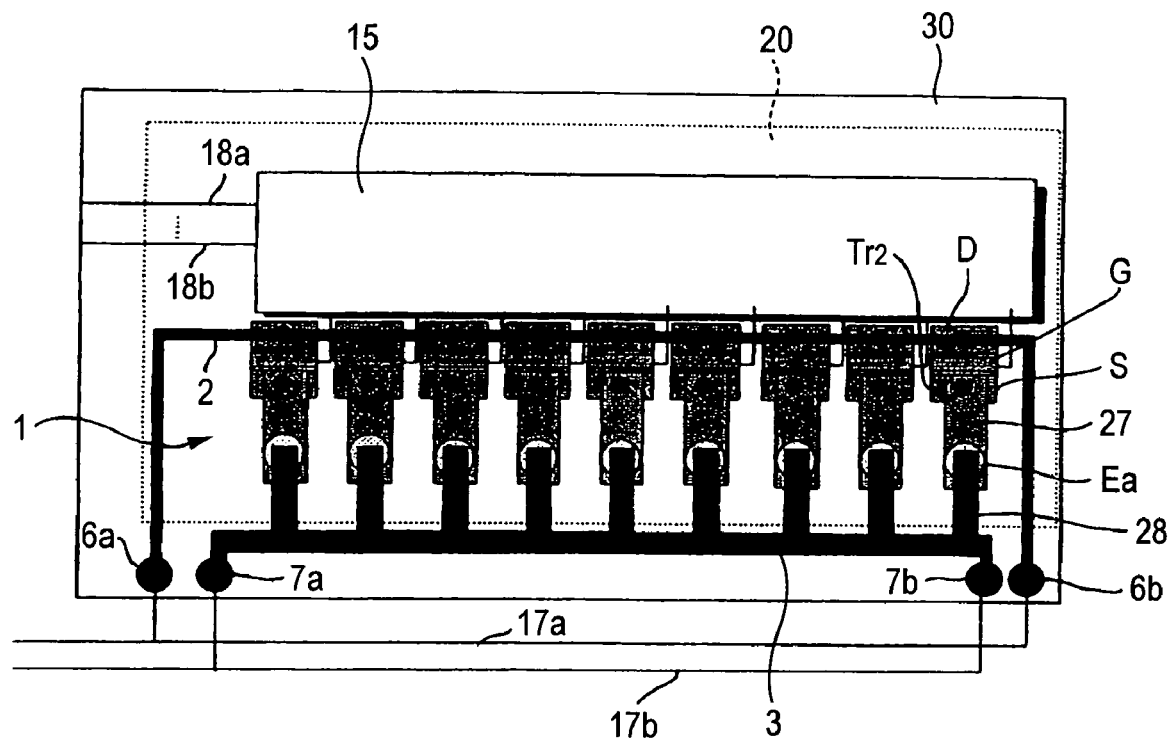
FIG. 30 is a plan view of a first related-art line head.

FIG. 1 shows a first embodiment of the invention. Components similar to those shown in FIG. 30 will be designated by the same reference characters and repetitive explanations for those will be omitted.

In this embodiment, trimming is carried out by a laser irradiation in a lead portion (a connection line) for connecting the cathode electrode of an organic EL element Ea to a second power line 3, and a cutout portion 25 is thus formed. The resistance value of the lead portion to be connected to the cathodes of the other organic EL elements is regulated corresponding to the lead portion to be connected to the cathode of an organic EL element having the lowest luminance (the darkest). In FIG. 1, nine organic EL elements Ea (photo emitters) are arrayed, however, the number of the plural photo emitters is arbitrary.

Figure 31:
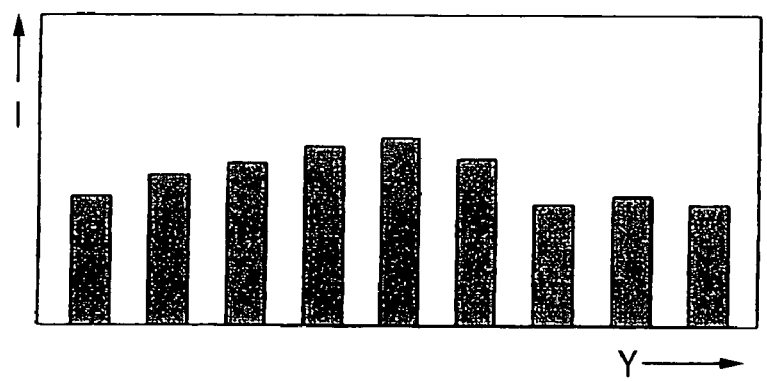
FIG. 31 is a diagram showing inequality of luminances of photo emitters in the line head of FIG. 30.
Figure 32:
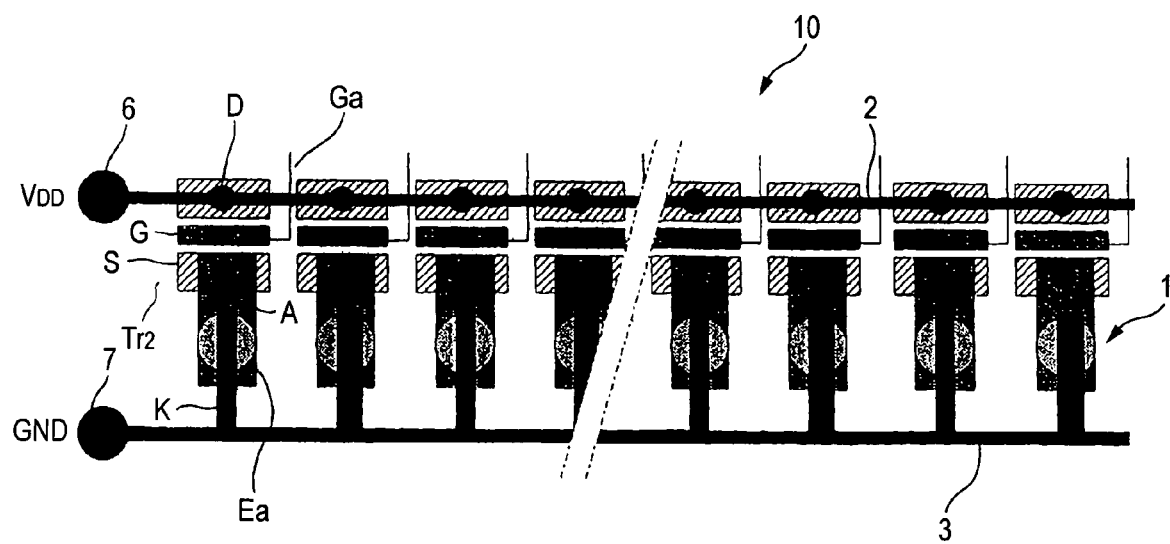
FIG. 32 is a plan view of a second related-art line head.
Figure 33:
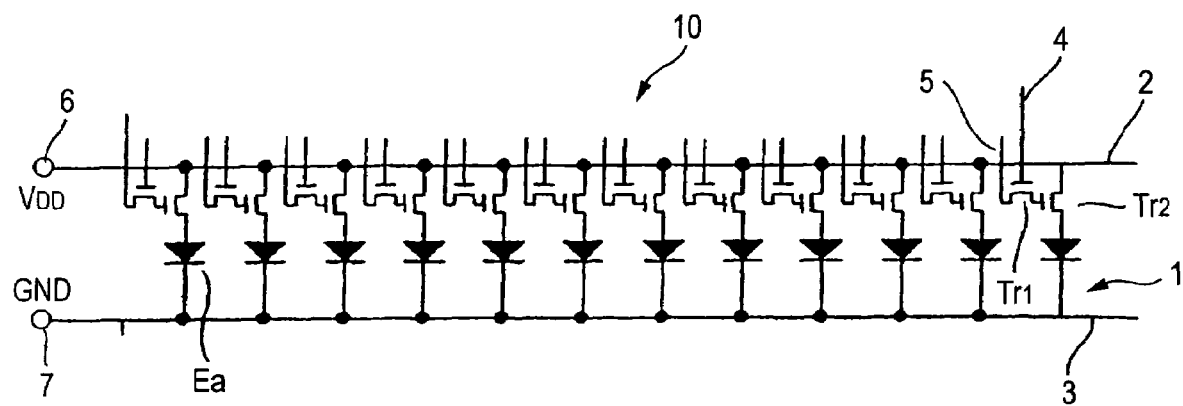
FIG. 33 is a circuit diagram of the line head of FIG. 32.

In other words, the cutout portion 25 is formed in the lead portion to be connected to the cathode of the organic EL element having a great luminance (bright), thereby increasing the resistance value of the lead portion. For this reason, a current flowing to the relevant organic EL element is decreased so that the amount of light emission (luminance) is reduced. The size of the cutout portion 25 is selected to obtain such a resistance value that a luminance in a primary scanning direction is equalized based on such a luminance characteristic shown in FIG. 31.

Such a processing is carried out in the following manner. (1) A luminance characteristic obtained by activating each photo emitter of a line head is stored in a storage of a control device. (2) A corrected resistance value in a connection line connected to each photo emitter is calculated by a processor such as a CPU in the control device. (3) A trimming processing is executed based on the result of the calculation to form a cutout portion.

Figure 2:
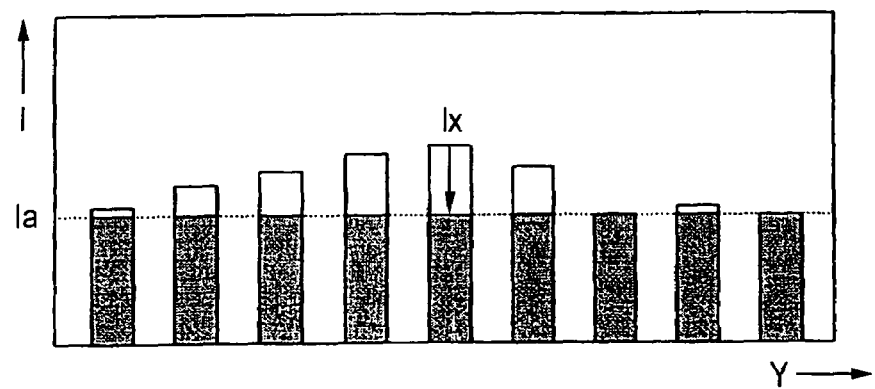
FIG. 2 is a diagram for explaining correction of inequality of luminances of photo emitters in the line head of FIG. 1.

In FIG. 2, a blank portion indicates a luminance obtained before the correction and a hatched portion indicates a luminance obtained after the correction. "Ia" indicates a line having the lowest luminance. As shown in FIG. 1, the cutout portion 25 is formed in the lead portion 28 so that a luminance in the position of a central part in the primary scanning direction is reduced by Ix and is regulated to the minimum line Ia, for example.

Figure 3:
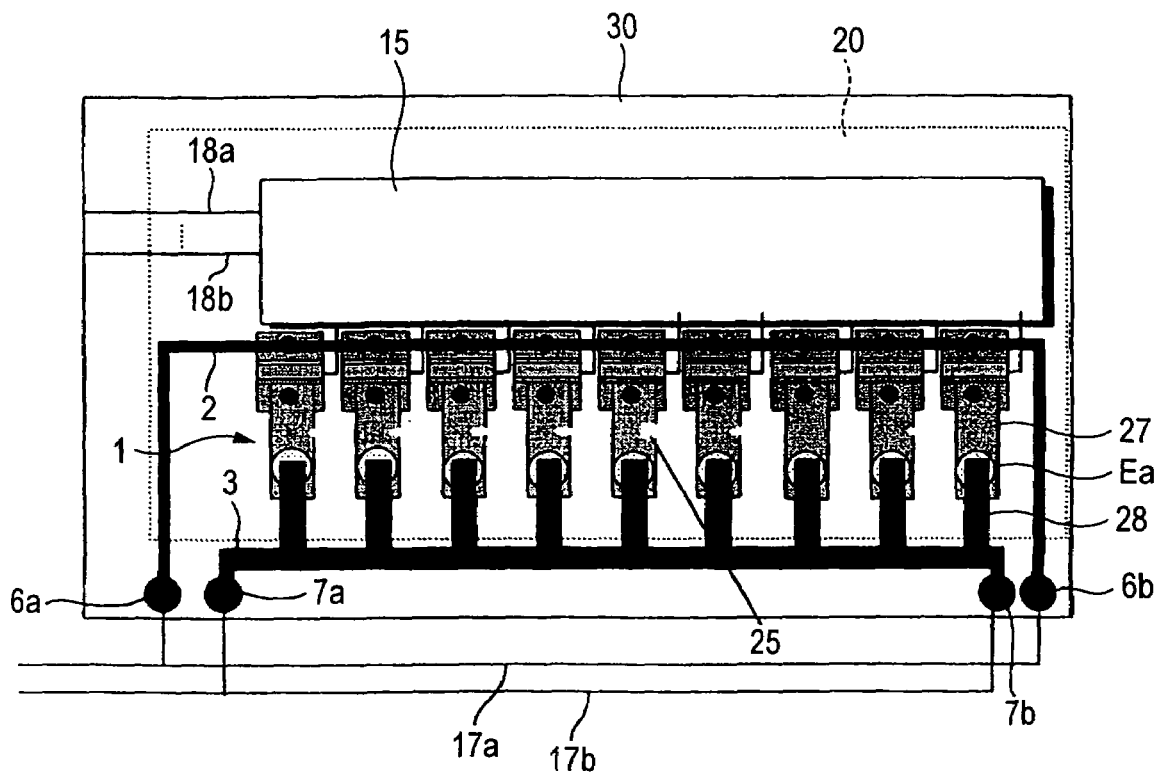
FIG. 3 is a plan view of a line head according to a second embodiment of the invention.

FIG. 3 shows a second embodiment of the invention. In this embodiment, the cutout portion 25 for regulating a resistance value is formed in a lead portion connected to an anode electrode of an organic EL element. More specifically, while the cutout portion 25 is formed on the second feeding line 3 side at a ground side (GND) in the first embodiment, it is formed on a first power line 2 side at a power supply side (VCC) in this embodiment.

The organic EL element is formed by laminating an insulating layer and a light emitting layer on a substrate such as a glass. An anode electrode or a cathode electrode to be a light emitting face which is opposed to an image carrier (a photoconductive member) is formed by a transparent electrode such as ITO (Indium Tin Oxide). Since a lead portion to be connected to such a transparent electrode has a relatively high resistance, a trimming control can easily be carried out. On the other hand, in case of a lead portion having a low resistance, it is necessary to greatly change a width so that the trimming control becomes complicated. When the cutout portion 25 is to be formed, whether the processing is carried out on the ground side (GND) in FIG. 1 or the power supply side (VCC) in FIG. 3 is determined in consideration of a decision whether the transparent electrode to be formed on the light emitting face is the anode electrode or the cathode electrode.

Figure 4:
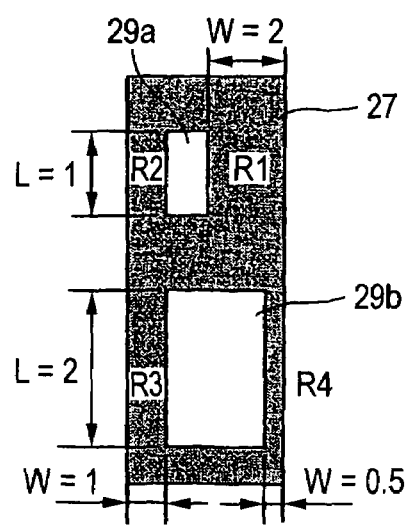
FIG. 4 is a diagram for explaining correction of inequality of luminances of photo emitters in a line head according to a third embodiment of the invention.

FIG. 4 shows a third embodiment of the invention. In this embodiment, a cutout portion to be formed in a lead portion 27 is preset to be rectangular window portions 29a and 29b having predetermined sizes. A width W of the lead portion 27 remaining after the formation of the window portions 29a and 29b is set to have a rate of 0.5, 1 and 2. Moreover, a length L of the window portions 29a and 29b is set to have a rate of 1 and 2. Thus, the cutout portion is formed by the rectangular window portions. Therefore, it is possible to easily carry out the processing of the cutout portion.

Referring to the resistance value of each portion in this case, if R1 is set to be R, R2 has a half width so that the resistance value is 2R. Since R3 has a double length of R2, the resistance value is 4R. Since R4 has a half width of R3, the resistance value is 8R. Thus, the lead portion 27 provided with the window portions 29a and 29b has a plurality of portions in which the resistance value R is $2^n$R (n is an integer of 1 or more). Accordingly, digital trimming can be carried out. Consequently, it is possible to easily correct the resistance value of the lead portion.

In this embodiment, when only the R1 portion is left and the three other portions, that is, the R2, R3 and R4 portions are cut away, the lead portion can have the resistance value of R. When only the R4 portion is left and the three other portions, that is, the R1, R2 and R3 portions are cut away, the lead portion can have the resistance value of 8R. The resistance values 2R and 4R of the lead portion are also obtained in the same manner. In this embodiment, the resistance value in the portion to be removed for the cutout portion can easily be calculated so that the resistance values in the residual portions can be obtained without an error. Therefore, it is possible to correct the resistance value of the connection line with high precision. By properly setting the lengths of the window portions 29a and 29b, the width of the lead portion after the formation of the window portions 29a and 29b and the number of the window portions, it is possible to select the resistance value of the lead portion to have a desirable value.

Figure 5:
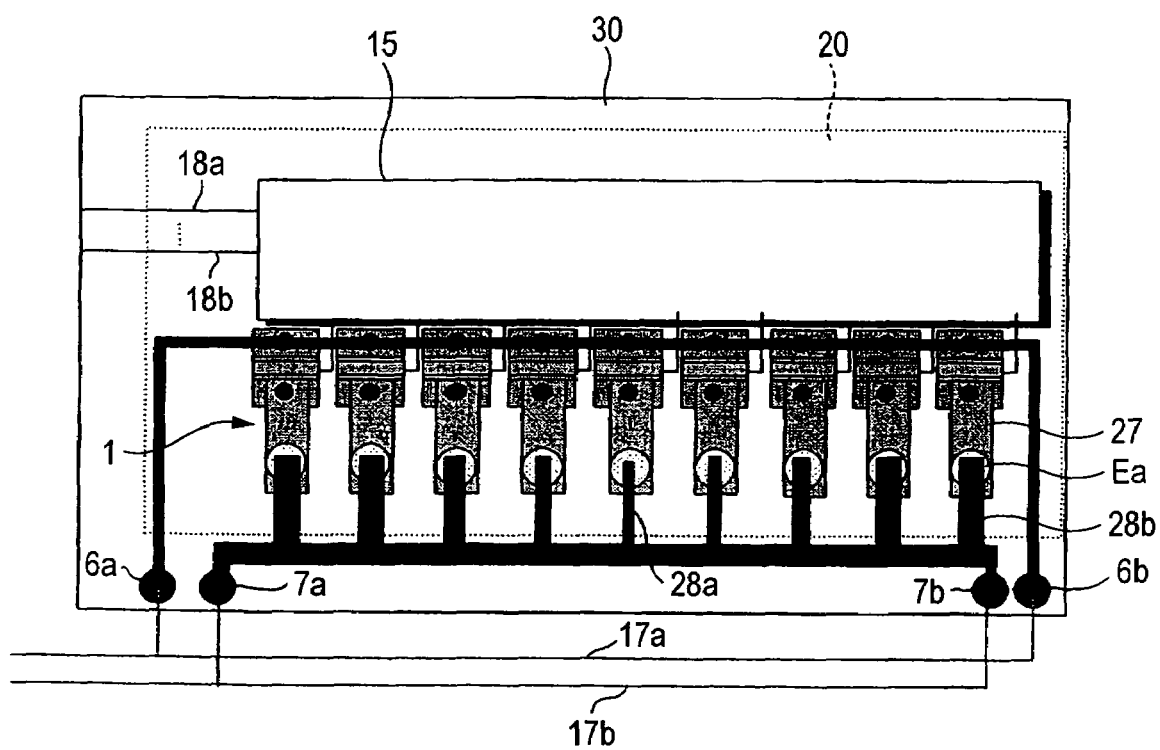
FIG. 5 is a plan view of a line head according to a fourth embodiment of the invention.

FIG. 5 shows a fourth embodiment of the invention. In this embodiment, the width of the lead portion is varied. More specifically, in a case where the luminance tends to be varied because of a manufacture, the distribution of the resistance value of the lead portion is determined in advance.

For instance, in a case where a luminance in a central part of the array tends to be high, the width of a lead portion 28a in the central part is set to be smaller than the widths of both ends 28b, so that the resistance value of the lead portion 28a is set to be greater than the resistance values of the both ends 28b. For a whole line, the width of the lead portion provided close to the central part in the primary scanning direction is reduced and the width of the lead portion provided close to the both ends is increased.

Figure 6:
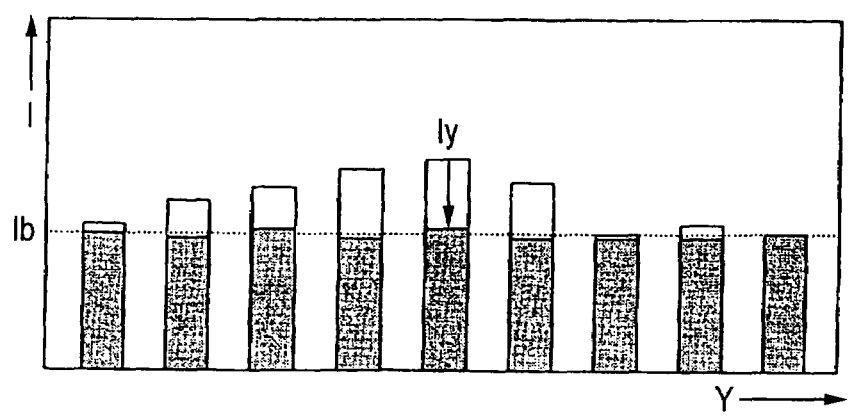
FIG. 6 is a diagram for explaining correction of inequality of luminances of photo emitters in the line head of FIG. 5.

FIG. 6 shows a luminance characteristic of the line head of FIG. 5 in a similar manner to FIG. 2. Here, "Ib" indicates a reference value of the luminance. In the vicinity of the central part in the primary scanning direction, the luminance is reduced by "Iy" to approach the reference value Ib. By varying the width of the lead portion, thus, it is possible to correct the tendency of inequality in the luminance l depending on a position Y in the primary scanning direction.

For the photo emitter, it is also possible to use an LED (Light Emitting Diode), for example, instead of the organic EL element. Since the organic EL element can be controlled statically, there is an advantage that a control system can be simplified. With a structure using the LED, the photo emitter can easily be manufactured.

Figure 7:
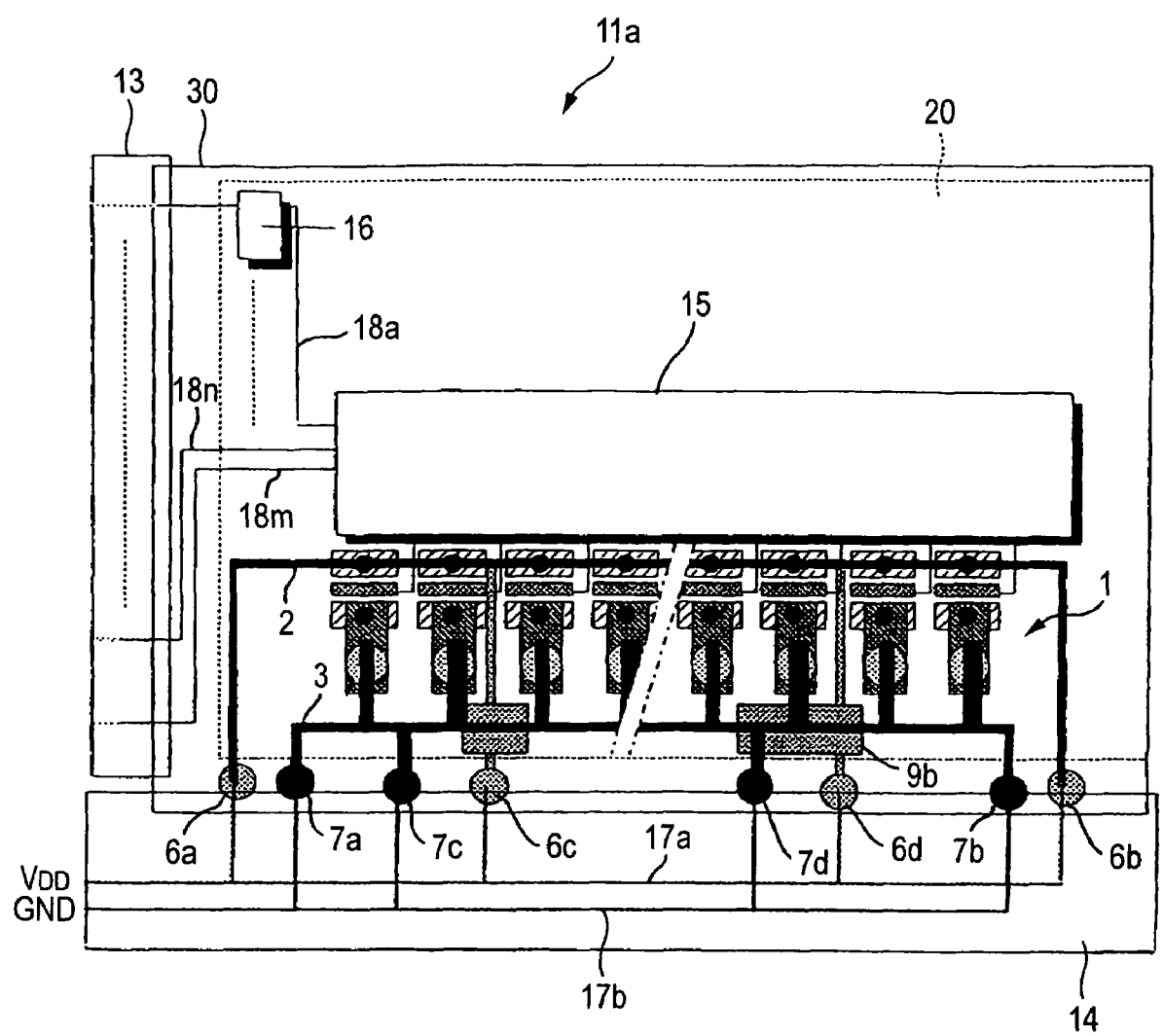
FIG. 7 is a plan view of a line head according to a fifth embodiment of the invention.

FIG. 7 shows a fifth embodiment of the invention. In a housing 11a, a photo emitter array 1, a control circuit 15 and an electrostatic breakdown preventing circuit 16 are provided on a substrate 30. Furthermore, a first FPC (Flexible Printed Circuit) 13 having a length reduced is provided on the short side of the line head. Furthermore, a second FPC 14 is provided along a line on the long side of the line head. A moisture-proof plate 20 for protecting the photo emitter mounted on the substrate 30 is provided above the substrate 30. The control circuit 15 generates a control signal for driving a drive transistor and a control transistor which are provided for each photo emitter arranged in the photo emitter array 1. A control signal line 18a to be connected to the electrostatic breakdown preventing circuit 16 and control signal lines 18n and 18m to be led to an outside are connected to the control circuit 15. The processing of regulating a resistance value is carried out over the connection line of the arrayed photo emitters as described with reference to the first to fourth embodiments.

In this embodiment, feeding points 6a, 6b on a power supply (VDD) side and feeding points 7a, 7b on a ground (GND) side are provided in positions on both sides of the line. A first power line 2 and a second power line 3 are bent perpendicularly in such a manner that the feeding points 6a, 6b and the feeding points 7a, 7b which are arranged on both sides of the array are opposed to the second FPC 14 disposed in the long side of the array. The feeding points 6a, 6b and the feeding points 7a, 7b are connected to an external power line 17a on the power supply side (VDD) and an external power line 17b on the ground side (GND) which are provided on the second FPC 14. Moreover, feeding points 6c, 6d are arranged between the feeding points 6a, 6b provided on both ends of the array and are thus connected to the external power line 17a on the power supply side (VDD).

Similarly, second feeding points 7c, 7d are arranged between the feeding points 7a, 7b provided on both ends of the array and are thus connected to the external power line 17b on the ground side (GND). An insulating member 9a is provided in the intersection of the second power line 3 and a lead line connecting the feeding point 6c and the first power line 2. An insulating member 9b is provided in the intersection of the second power line 3 and a lead line connecting the feeding point 6d and the first power line 2.

In this embodiment, the feeding point of the first power line on the power supply side and the feeding point of the second power line on the ground side are provided on both sides of the array, and furthermore, a plurality of feeding points is provided on the power supply side and the ground side at the long side of the array so that the number of the feeding points is increased. Therefore, it is possible to suppress the influence of a fluctuation in the electric potential of the power line for each photo emitter. Accordingly, no difference is made between the amounts of light emission of the arrayed photo emitters. Consequently, inequality is not generated in the lifetime of the photo emitter.

Here, the positions and number of the feeding points to be connected to the external power lines are arbitrary.

Thus, the feeding points to be connected to the external power lines are provided so that the influence of a drop in the voltage of the power line is more reduced. For this reason, a difference is not made between voltages to be applied to the photo emitters. Consequently, it is possible to equalize the amounts of light emission. Accordingly, it is possible to decrease the difference between the applied voltages depending on the position of the photo emitter Ea relative to the first power line 2.

In this embodiment, moreover, the first FPC 13 having a length reduced in a longitudinal direction is provided on the short side of the line and the second FPC 14 is provided along the line on the long side of the line. Thus, the FPC is divided into two portions on the short and long sides of the line and they are thus provided in the empty spaces of the line head. For this reason, the size on the short side of the line is reduced so that the installation space of the housing can be saved. The photo emitter array is formed on the long side of the line head, which is an originally necessary space. Even if the second FPC 14 is provided, therefore, the size on the long side is not changed. The wiring of the control circuit and the wiring of the power line are mounted through the flexible FPC. Also in a case where the line head is to be curved, therefore, an attachment can easily be carried out.

Figure 8:
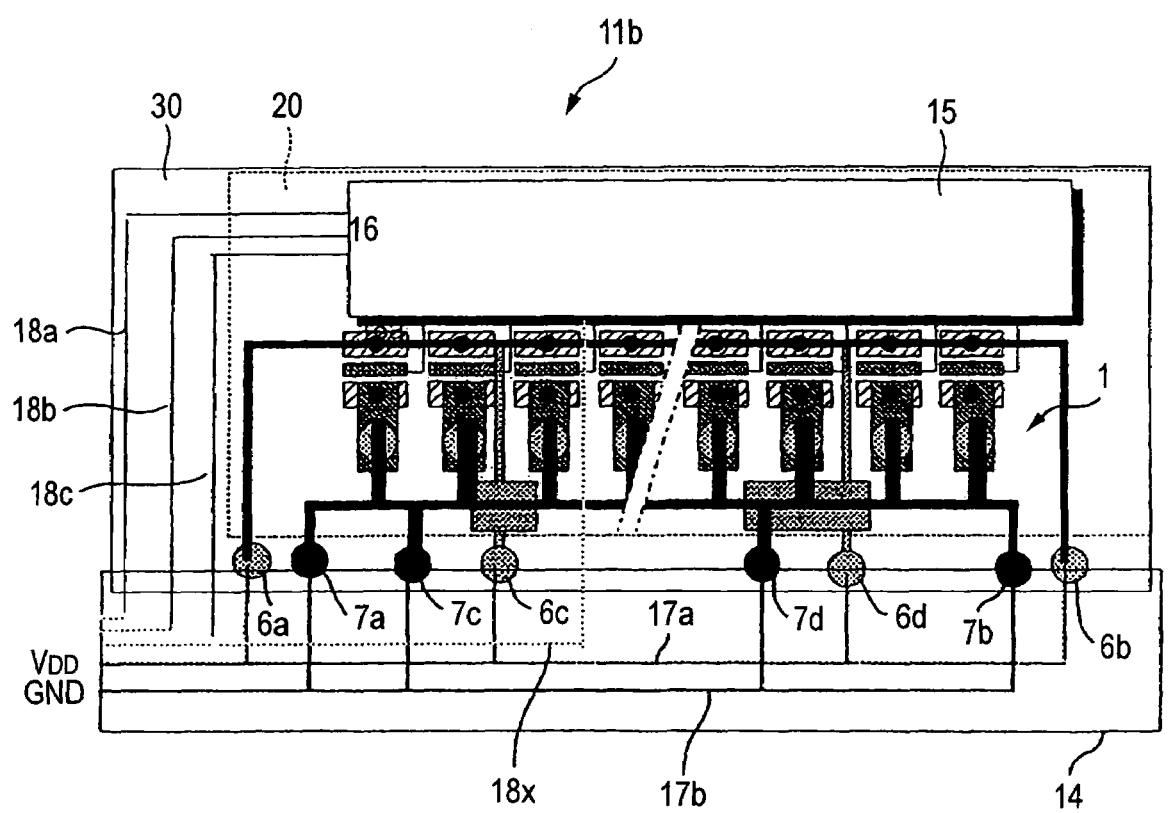
FIG. 8 is a plan view of a line head according to a sixth embodiment of the invention.

FIG. 8 shows a sixth embodiment of the invention. Components similar to those in the fifth embodiment will be designated by the same reference characters. In this embodiment, the first FPC 13 shown in FIG. 7 is omitted. Signal lines 18a to 18c to be connected to a control circuit 15 are directly led out of the short side of a line head. Thus, there is omitted the FPC to be provided in a longitudinal direction on the short side of the line head. Therefore, it is possible to considerably save a space in the direction of the short side of a housing 11b.

The signal lines 18a to 18c to be connected to the control circuit 15 are coupled to the long side of the line head. For this reason, a size on the long side is correspondingly increased slightly. However, a gear train for driving an image carrier is provided on the end of the line head and the size is not increased greatly as seen from the whole housing. Also in this embodiment, the processing of regulating a resistance value is carried out over the connection line of the arrayed photo emitters as described with reference to the first to fourth embodiments.

A signal line 18x is wired from an FPC 14 to the control circuit 15. Thus, the FPC 14 can also mount the wiring of the power lines to feeding points 6a to 6d and 7a to 7d, and furthermore, a wiring to the control circuit 15. The FPC can carry out a high density wiring. Therefore, the control circuit 15 can also be omitted. In this case, a control signal for driving a drive transistor and a control transistor which are provided for each of the photo emitters is formed on an outside and a signal line is connected to the FPC. Accordingly, a size on a short side in the housing of the line head can further be decreased.

Figure 9:
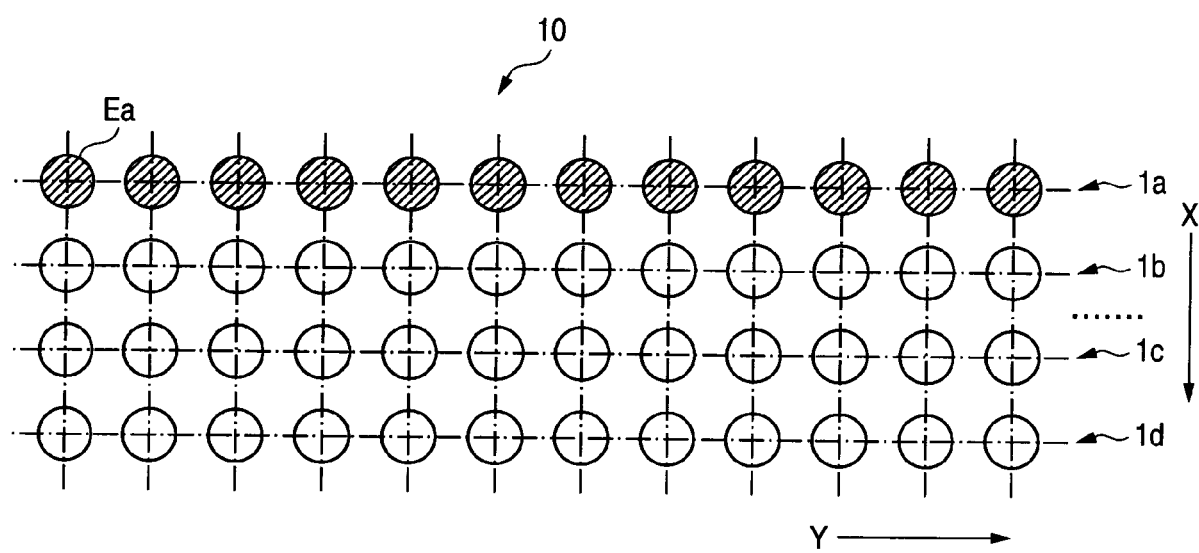
FIG. 9 is a diagram for explaining a line head according to a seventh embodiment of the invention.

FIG. 9 shows a seventh embodiment of the invention. In this embodiment, a line head 10 is provided with a photo emitter array 1a in which a large number of photo emitters Ea are arrayed in a primary scanning direction Y. The photo emitter array is formed in a plurality of rows (arrays) in a secondary scanning direction X. In this embodiment, four arrays 1a, 1b, 1c and 1d are provided. The processing of regulating a resistance value as described with reference to the first to fourth embodiments is carried out over the connection line of the photo emitters arranged in each of the arrays 1a to 1d.

In this embodiment, the photo emitter array 1b is formed as a photo emitter array for a preliminary operation and is not usually used. In a case where any of the photo emitters Ea of the photo emitter array 1a for a normal operation which is to be used in a normal printing processing has a failure, the photo emitter array 1b for the preliminary operation is used by a switcher which will be described below in detail. The photo emitter arrays 1c and 1d can be used when a multiple exposure is to be carried out, for example.

Here, the photo emitter array provided for the preliminary operation is not restricted to only one line. The photo emitter array 1c can also be formed for the preliminary operation of the photo emitter array 1d. In the line head for the multiple exposure, an arbitrary number of arrays can be used as the photo emitter arrays for the normal operation. The combination of the number of photo emitter array used in the normal operation and the number of preliminary photo emitter array is also arbitrary.

Figure 10:
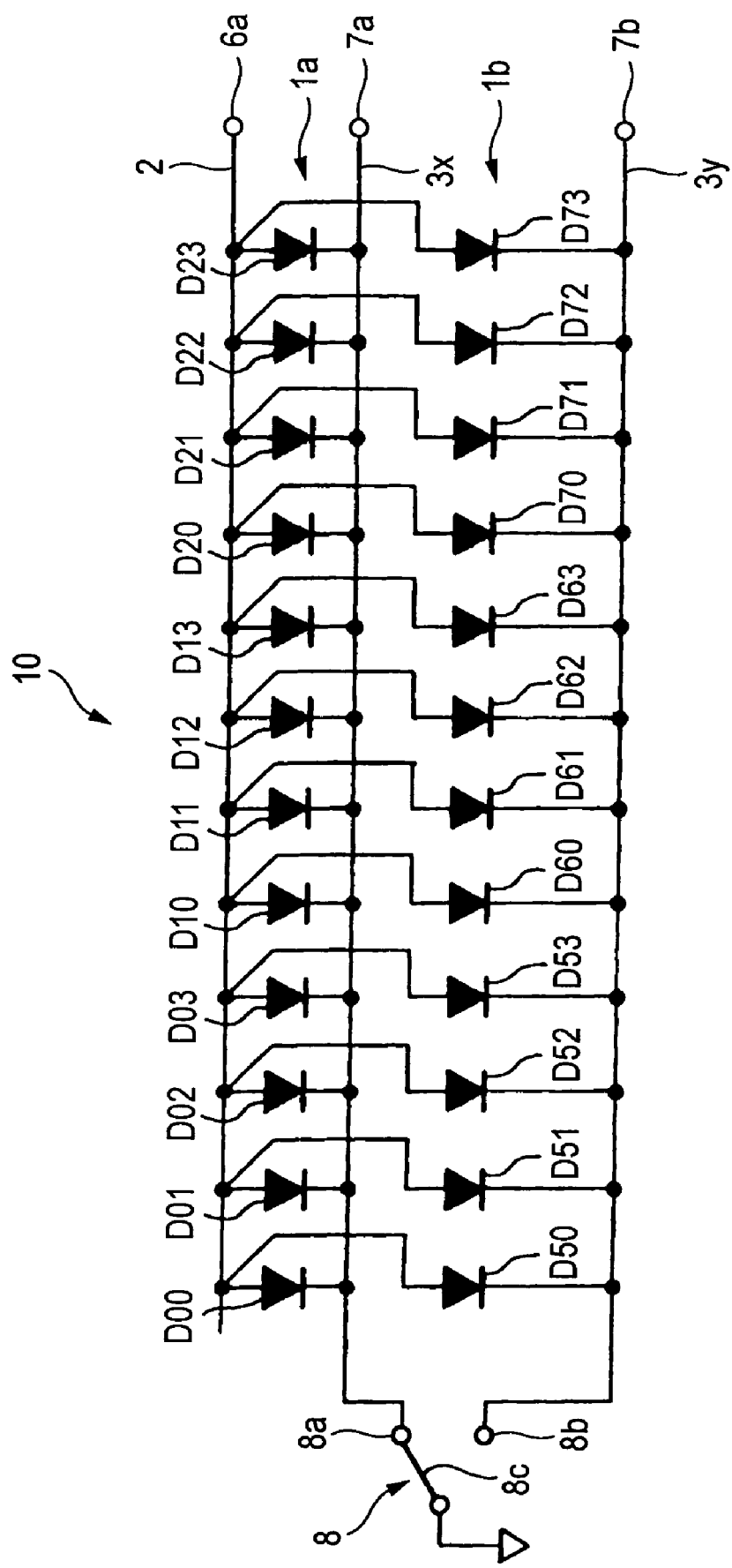
FIG. 10 is a circuit diagram for explaining a line head according to an eighth embodiment of the invention.

FIG. 10 shows an eighth embodiment of the invention. A line head 10 of this embodiment is provided with photo emitter arrays 1a and 1b. Photo emitters D00 to D23 using organic EL elements are arranged in the photo emitter array 1a, for example. Moreover, photo emitters D50 to D73 using the organic EL elements are also arranged in the photo emitter array 1b. A first power line is connected to feeding points 6a, 6b on a power supply (VDD) side, and second power lines 3x, 3y are connected to feeding points 7a, 7b on a ground (GND) side. The processing of regulating a resistance value as described with reference to the first to fourth embodiments is carried out for the connection line of each of the photo emitters in the photo emitter arrays 1a and 1b.

In a case where a contact 8c of a switcher 8 is set to a contact 8a side, a DC voltage is applied between the first and second power lines 2 and 3x so that each of the photo emitters D00 to D23 of the photo emitter array 1a carries out a lighting operation. In a case where the contact 8c of the switcher 8 is set to a contact 8b side, a DC voltage is applied between the first and second power lines 2 and 3y so that each of the photo emitters D50 to D73 of the photo emitter array 1b carries out the lighting operation.

The photo emitter array 1a is provided for a normal operation, and the photo emitter array 1b is provided for a preliminary operation. In a case where a failure is generated on any of the photo emitters D00 to D23 of the photo emitter array 1a, a voltage is applied to each of the photo emitters D50 to D73 of the photo emitter array 1b through the switcher 8. Thus, the power lines 3x and 3y to which the cathode side of the photo emitter of each of the photo emitter arrays is connected in common is changed over through the switcher 8. The operated photo emitter array is thus changed over.

Here, the first power line 2 is connected to the anode electrode of the photo emitter of each of the photo emitter arrays in common. That is, the power line 2 maintains the state of a common connection through two photo emitter arrays and only the other power lines 3x and 3y are changed over. For this reason, the structure of the switcher can be simplified more greatly as compared with a case where both of the power lines are to be changed over together. Moreover, the changeover operation can be carried out smoothly.

The switcher 8 can have such a structure as to use an electronic switch of a transistor in addition to the mechanical switch shown in FIG. 10. Moreover, one of the photo emitter arrays 1a and 1b is used for a normal operation and the other is used for a preliminary operation. It is also possible to use the photo emitter arrays 1b and 1a for the normal operation and the preliminary operation, respectively. In a case where the switcher is constituted by a switching transistor, the photo emitter arrays can be changed over quickly with high precision.

FIGS. 11A and 11B show a ninth embodiment of the invention. In this embodiment, a power line 2a is formed at a power supply (VDD) side and a ground (GND) side on a substrate 30, respectively. Auxiliary power lines 21, 23 are provided on the lower face of a moisture-proof plate 20. The moisture-proof plate 20 serves to protect an organic EL element (not shown) formed on the substrate 30. The regulation of a resistance value described with reference to the first to fourth embodiments is carried out over the connection line of each of the photo emitters.

The auxiliary power line 21 is provided on the power supply (VDD) side and the auxiliary power line 23 is provided on the ground (GND) side. 22a to 22n denote the feeding points of the auxiliary power line 21, and 24a to 24n denote the feeding points of the auxiliary power line 23. The feeding points 22a to 22n and 24a to 24n formed on the moisture-proof plate 20 are electrically connected to the feeding points of the power line 2a provided on the substrate 30 through a connecting member 31.

In this embodiment, the number of the feeding points is increased. For the photo emitter arranged in any of positions in the array, it is possible to suppress the influence of a fluctuation in the voltage of the power line. Accordingly, it is possible to set a structure in which the amounts of light emission of the arrayed photo emitters make no difference. For the connecting member 31, it is possible to use an adhesive constituted by conductive particles, for example. Therefore, it is possible to strongly connect each of the feeding points of the power line to each of the feeding points of the auxiliary power line.

The power line on the power supply (VDD) side connected to the substrate 30 is covered with a partition wall member. For this reason, it is possible to electrically connect the feeding point on the substrate 30 side to the feeding point on the moisture-proof plate 20 side by forming a contact hole and inserting the connecting member 31 therein, for example. Since the auxiliary power lines 21 and 23 are provided on the moisture-proof plate 20 which is not originally provided with a member but is an empty space. Therefore, the space can be utilized effectively.

Moreover, a large number of feeding points 22a to 22n and 24a to 24n are provided on the moisture-proof plate 20 and are electrically connected to the feeding points on the substrate 30 side through the connecting member 31. Therefore, the influence of a fluctuation in the voltage of the power line on each of the photo emitters can be suppressed and a difference between the amounts of light emission can be eliminated. Moreover, since the auxiliary power lines 21 and 23 are wide belt-shaped, it is possible to decrease a resistance value. When the auxiliary power lines 21 and 23 are formed by an opaque material, for example, it is possible to prevent a stray light from being irradiated from the photo emitter in an opposite direction to an image carrier.

The above description is intended for the line head to be used in an image forming apparatus such as a monochrome printer. In the invention, however, it is a matter of course that the same line head is also applied to a 4-cycle type color printer or a tandem type color printer. In these color printers, it is possible to suppress inequality in the amount of light emission in each of the photo emitters arranged in the line head by employing the structure according to the invention. Moreover, the photo emitter can be protected from an overvoltage.

Figure 12:
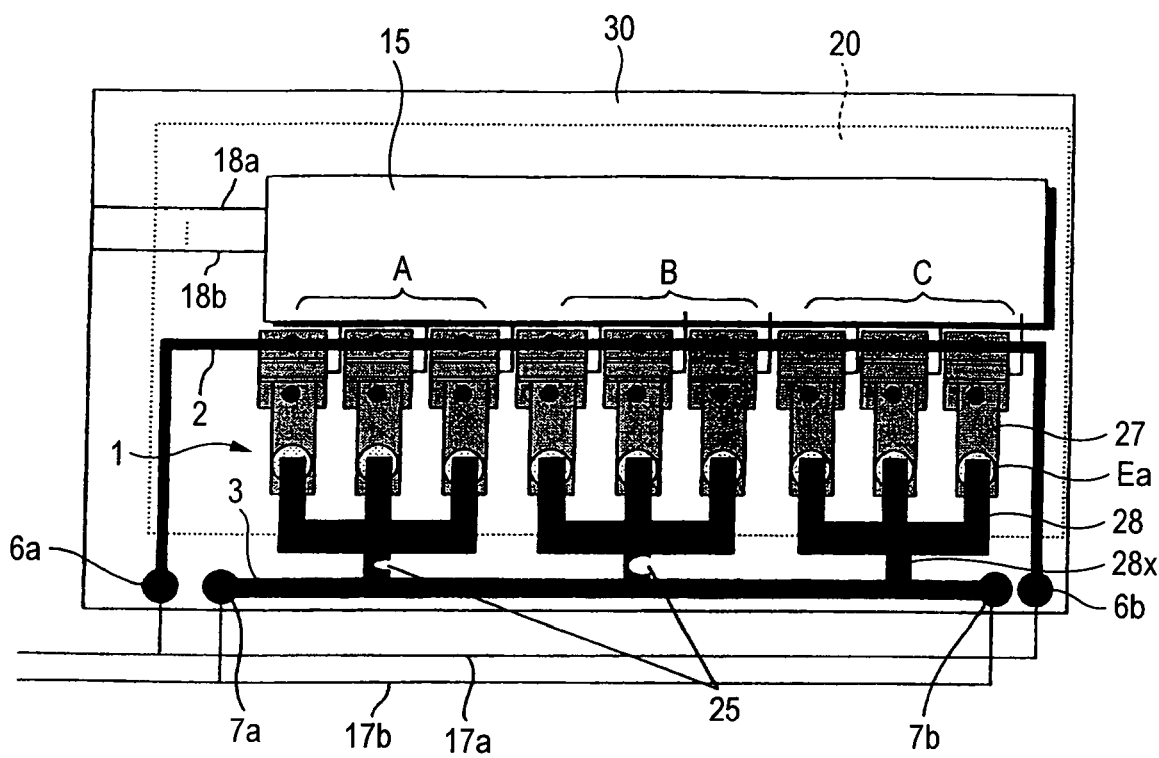
FIG. 12 is a plan view of a line head according to a tenth embodiment of the invention.

FIG. 12 shows a tenth embodiment of the invention. In this embodiment, organic EL elements Ea are divided into a plurality of groups of A, B and C. Trimming is carried out by a laser irradiation in a common lead portion (a common connection line) 28x for connecting the cathode electrode of each organic EL element Ea to a second power line 3 and a cutout portion 25 is thus formed. Thus, the resistance value of the common lead portion to be connected to the cathodes of the organic EL elements in the other groups is regulated corresponding to the common lead portion to be connected to the cathode of an organic EL element in a group having the lowest luminance (the darkest). In this embodiment, three organic EL elements Ea are included in each of the groups, however, the number of the EL elements in each of the groups may be arbitrary. The number in one group may be different from another group. In such a case, it is possible to enhance the degree of freedom of the formation of an image and to correspond to the formation requirement of an image in various configurations.

More specifically, the cutout portion 25 is formed in the common lead portion 28x to be connected to the cathode of the organic EL element in a group having a great luminance (bright), thereby increasing the resistance value of the common lead portion 28x. For this reason, a current flowing to the organic EL element in the relevant group is decreased so that the amount of light emission (luminance) is reduced. The size of the cutout portion 25 is selected to obtain such a resistance value that a luminance in a primary scanning direction is equalized based on the luminance characteristic shown in FIG. 31.

Such a processing is carried out in the following manner. (1) Dividing the photo emitters into plural groups, activating the photo emitters to obtain a luminance characteristic on a group basis, and storing the luminance characteristics of each of the groups in a storage of a control device. (2) A corrected resistance value in a common connection line connected to each group is calculated by a processor such as a CPU in the control device. (3) A trimming of the common connection line is executed based on the result of the calculation to form a cutout portion.

Figure 13:
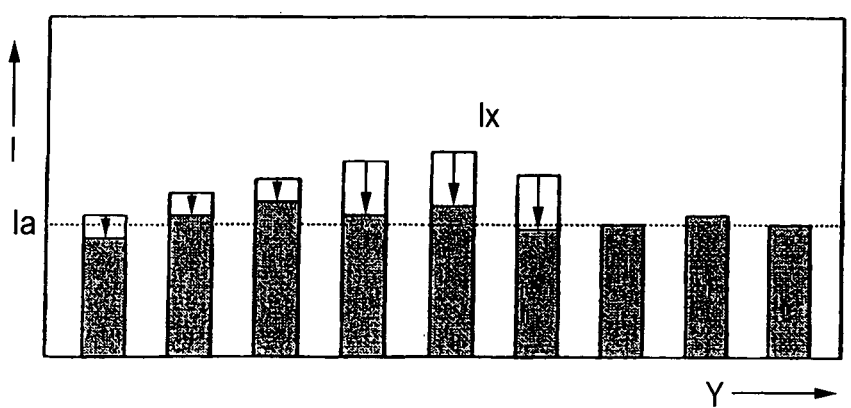
FIG. 13 is a diagram for explaining correction of inequality of luminances of photo emitters in the line head of FIG. 12.

In FIG. 13, a blank portion indicates a luminance obtained before the correction and a hatched portion indicates a luminance obtained after the correction. "1a" indicates a portion indicative of a level having the lowest luminance. As shown in FIG. 12, the cutout portion 25 is formed in the common lead portion 28x so that a luminance in the position of a central part in the primary scanning direction is reduced by "lx" and is corrected to the minimum level 1a, for example.

Figure 14:
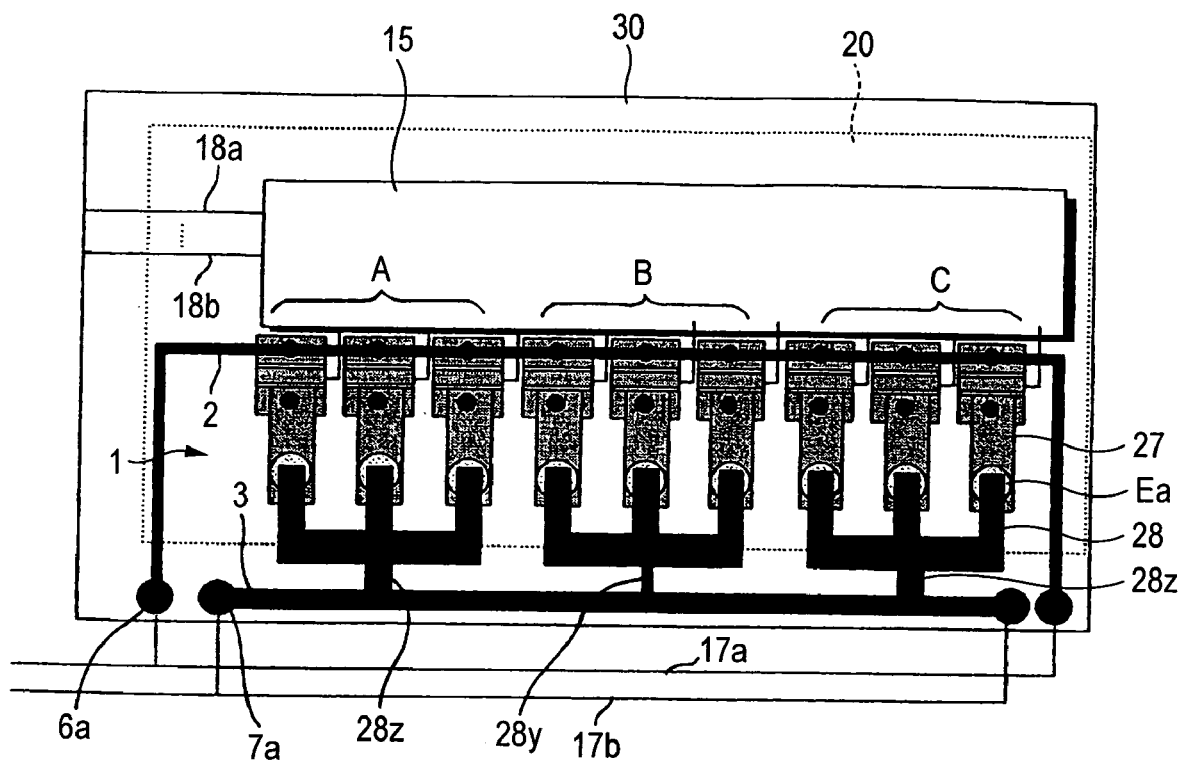
FIG. 14 is a plan view of a line head according to an eleventh embodiment of the invention.
Figure 15:
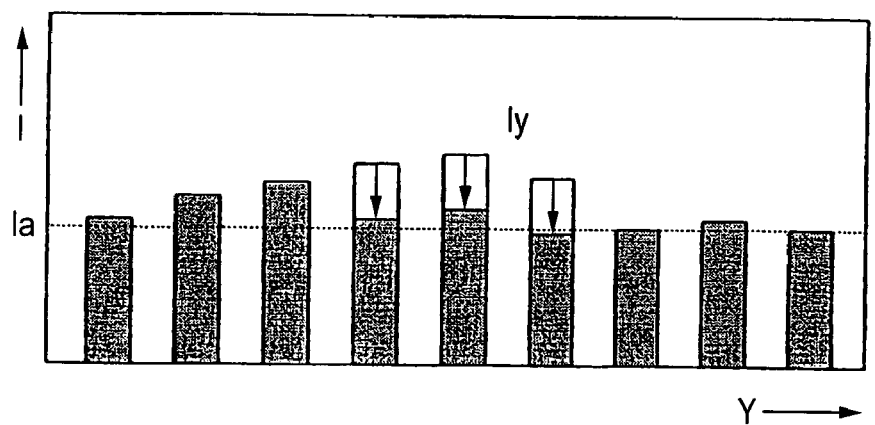
FIG. 15 is a diagram for explaining correction of inequality of luminances of photo emitters in the line head of FIG. 14.

FIG. 14 shows an eleventh embodiment of the invention. In this embodiment, in a case where the luminance tends to be varied because of a manufacture, the distribution of the resistance value of the common lead portion is determined in advance.

More specifically, in a case where a luminance in a central part tends to be great in the primary scanning direction of the array, the width of a common lead portion 28y in the group of the central part of the array is set to be smaller than the width of a common lead portion 28z in the groups on both ends of the array. For this reason, the resistance value of the common lead portion 28y corresponding to the group of the central part of the array is set to be greater than the resistance value of the common lead portion 28z corresponding to the groups on both ends of the array. For a whole array, the width of the common lead portion corresponding to the group provided close to the central part in the primary scanning direction is reduced and the width of the common lead portion corresponding to the group provided close to the both ends thereof is increased.

The formation of the cutout portion described with reference to the third embodiment can be applied in the similar way. Further, the configurations described in the tenth and eleventh embodiments can be applied to the line heads described in the fifth to ninth embodiments.

Next, a twelfth embodiment of the invention will be described with reference to FIGS. 16 to 23.

Figure 17:
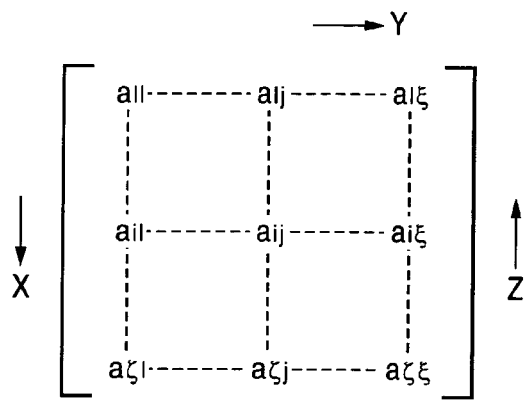
FIGS. 17 and 18 are diagrams for explaining how to control the line head of FIG. 16.

FIG. 17 shows an example of image data created in an external apparatus such as a host computer. The number of pixels in a primary scanning direction Y and the number of pixels in a secondary scanning direction X of an image to be printed are represented by $\xi$ and $\zeta$, respectively. "Z" represents a paper feeding direction.

For the image to be printed, it is created gray scale data a matrix form having $\xi$ columns in the primary scanning direction and $\zeta$ rows in the secondary scanning direction by the external apparatus. In the gray scale data, $a_{11}$ represents a density on a left top end pixel of a recording medium, $a_{ij}$ represents a density in a pixel at an i-th position from the left end and a j-th position from the top end, and $a_{\xi\zeta}$ represents a density of a right bottom end pixel. In this specification, an array in the primary scanning direction of the pixel data is indicated as a column and an array in the secondary scanning direction is indicated as a row.

A primary scanning period $t_H$ required for a certain row is divided into k of sub periods $t_{Hs}$. Furthermore, the sub period $t_{Hs}$ is divided into m of unit periods $t_{Hsb}$. Herein, k represents an integer which is more than the number of gradations to be reproduced, m represents an integer which satisfies $nm \geq \xi$ (n is a positive integer), and furthermore, data in a "j" column are set to be b-th data in an a-th group. Here, j−1=am+b must be satisfied.

Figure 18:
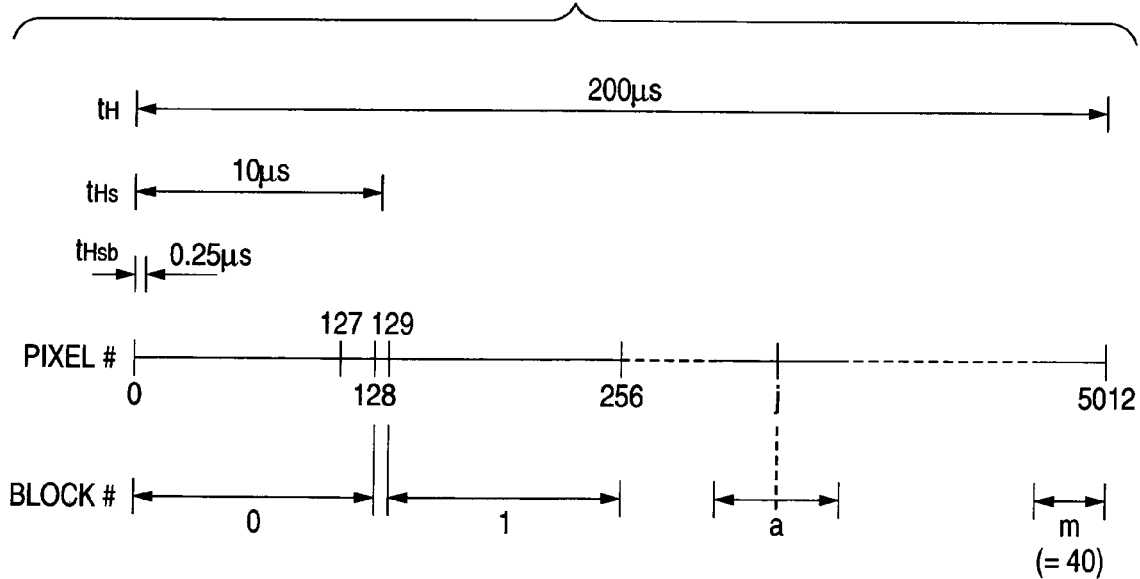

FIG. 18 shows a specific example of the image data. In a case where the number of pixels in the primary scanning direction (=$\xi$) is 5012 pixels to be divided into 40 groups (=m), n becomes 128 (bits). In this case, 5012 pixels are represented by 39 groups of 128 bits of data and one group of 20 bits of data. For example, gray scale data in a 128th column are 127th data in a zero-th group. Moreover, the sub period $t_{Hs}$ is set to be 10 μsec. Since the number of the unit periods (=m) is 40, the unit period $t_{Hsb}$ is 10/40=0.25 μsec. When the number of the sub period (=k) is 20, the primary scanning period $t_H$ is 200 μsec which is twenty times as long as the sub period $t_{Hs}$.

A data converter in this embodiment serves to recognize which primary scanning period, which sub period and which unit period to which each of the gray scale data shown in FIG. 17 belongs. Such recognition can easily be performed by combining proper counter circuits to count the number of pixels, for example. Next, the gray scale data are converted into time data corresponding to the density.

Description will be given to a first example in which the gray scale data are converted into the time data. The gray scale data $a_{ij}$ of an arbitrary pixel is converted in the following manner. Data for a sub period in an arbitrary group for an i-th primary scanning period is converted into ON data (1) in a case where the value of the gray scale data $a_{ij}$ is more than an order value of the relevant sub period; and is converted into OFF data (0) in the other cases. In this example, the order value is a numeric value corresponding to any value for the sub periods divided into the k groups, that is, an integer of 1 to k.

For a conversion into the time data, a conversion into the ON data may be carried out in a case where the value of the gray scale data $a_{ij}$ is more than the value of (k−the order value of the relevant sub period) is set and a conversion into the OFF data may be carried out in the other cases. The former is turned on at an early stage for the primary scanning period and the latter is turned on in the latter half of the primary scanning period.

Furthermore, the conversion into the ON data may be carried out in a case where (the value of gray scale data $a_{ij}$/2) is more than [(k−the order value of the relevant sub period)/2] or (the value of gray scale data $a_{ij}$/2) is more than (the order value of the relevant sub period/2) is set, and the conversion into the OFF data may be carried out in the other cases. In such a case, light emission is executed in the middle of the primary scanning period.

Contrary to the processing described above, it is also possible to set conditions for inhibiting the light emission in the middle of the primary scanning period. These conditions do not need to be the same for all of the pixels but may be varied for the adjacent pixels, for example. Moreover, these conditions may be set differently depending on an image to be printed. For example, the same conditions are preferable for the text printing, and different conditions are preferable for the gradation image printing. In a case where a plurality of pixels is used in multicolor printing, furthermore, setting may be changed for each color. Thus, these printing conditions can be set properly.

Figure 16:
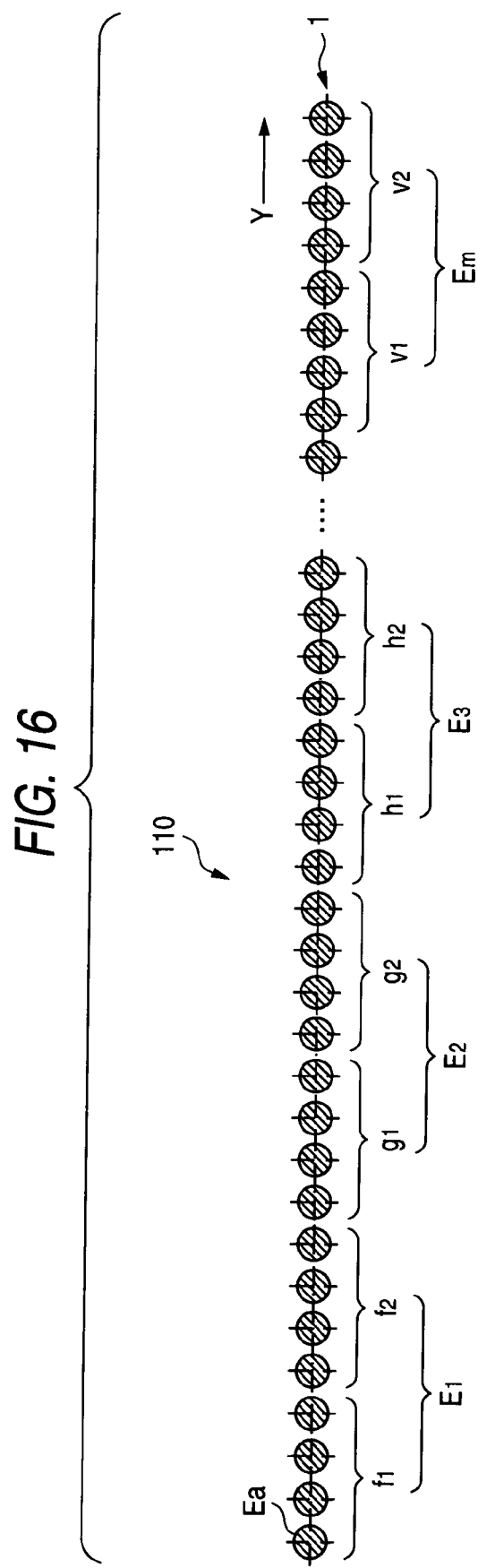
FIG. 16 is a diagram for explaining a line head according to a twelfth embodiment of the invention.

FIG. 16 shows a line head 110 according to this embodiment. A plurality of photo emitters Ea are arrayed in the primary scanning direction Y to form a photo emitter array 101. An organic EL element or an LED is used for the photo emitter Ea. "n" of photo emitters are collected into each of "m" of large groups E1 to Em. In this example, eight (n=8) photo emitters are arranged in each of the large groups. Moreover, each of the large groups is divided into "u" of small groups having "p" of photo emitters.

In this embodiment, the small group is formed by (p=4) photo emitters and the number of the small groups is (u=2). The large group E1 includes two small groups f1 and f2, each of which has four photo emitters. Each of the large groups E2, E3 . . . include small groups g1 and g2, h1 and h2 . . . . The number of the large groups (=m) is set to 40, for example. The values of m, n, u and p may be arbitrary.

Each of the large groups is selected by the output signal of a shift register circuit as will be described below. Moreover, the small groups in the large group thus selected are selected by a decoder using a TFT transistor. A data signal obtained by converting the gray scale data into the time data as described above is supplied to the photo emitter thus selected, and a time required for light emission of each photo emitter is controlled. For this reason, the gradation control of an image to be printed can be carried out so that a gradation image can be obtained with high quality. The control of the large group and the small group will be described with reference to FIGS. 22 and 23.

In this embodiment, image data transmitted from a host computer to an image forming apparatus are stored in a storage by way of an image processor. The data structure of the image data forms a set of gradation data on each of colors of R, G and B for every dot. The image data stored in the storage are subjected to a predetermined image processing and are thus transferred to a line head.

Figure 19:
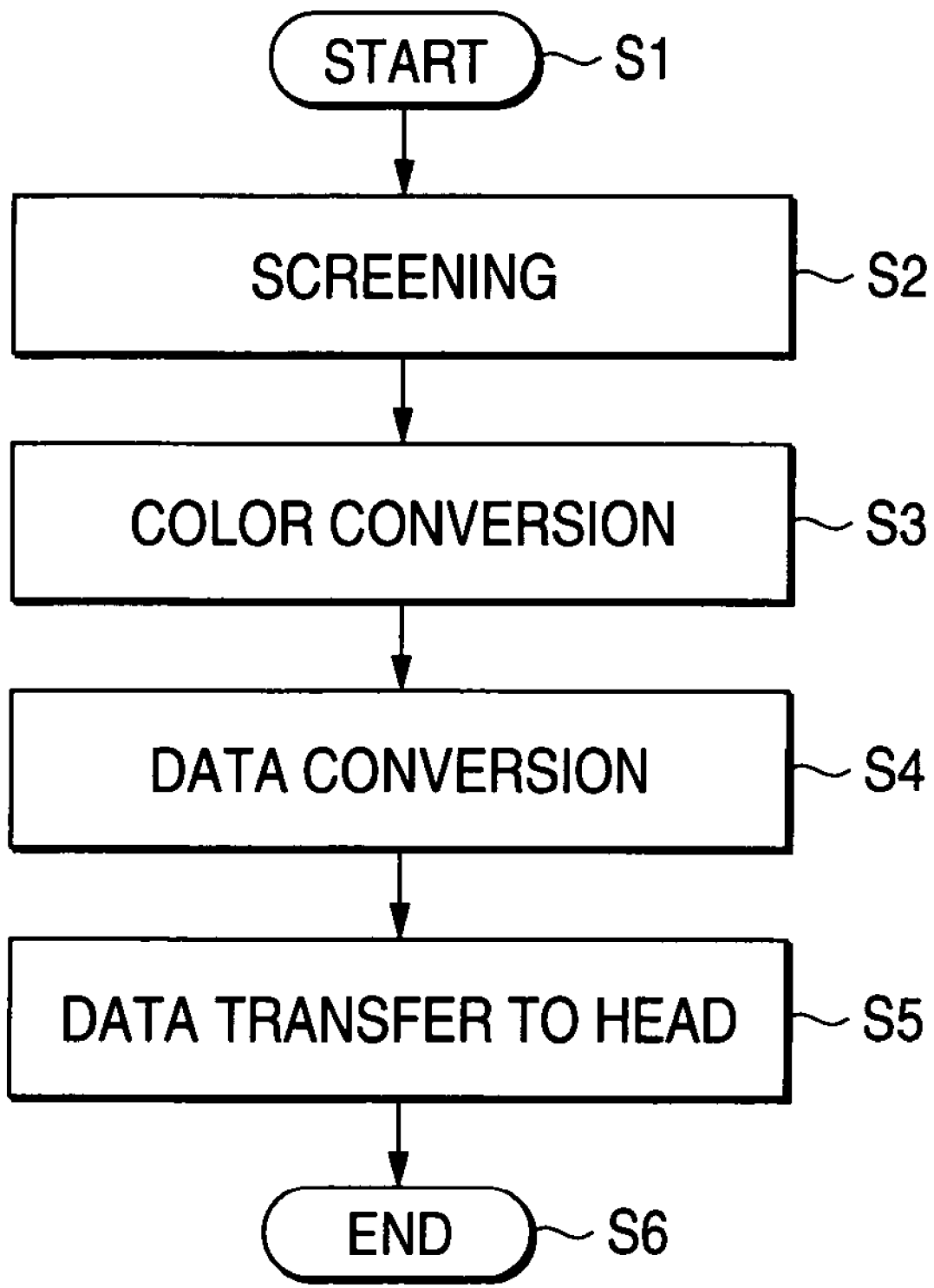
FIG. 19 is a flow chart showing how to control the line head of FIG. 16.

Specifically, as shown in FIG. 19, a processing program is activated (Step S1). Next, a screening is carried out (Step S2). The screening is executed in order to take a matching with the process condition of the image forming apparatus and to maintain a gradation reproducibility. For the type of a screen, there have been known a fine stripe pattern, an error diffusion pattern and a dot pattern. Usually, they are used in combination. A data structure based on the processing forms a set of gradation data on each of the colors of R, G and B for every dot in the same manner as the data structure stored in the storage.

Subsequently, a color conversion is carried out (Step S3). This processing serves to convert the image data subjected to the screening into data separated into colors corresponding to respective image forming stations. The data structure forms a set of gradation data for every dot. Next, a data conversion into data to be transferred to the line head is performed for the data subjected to the color conversion (Step S4). Next, the converted data are transferred to the line head (Step S5), and the processing program is finished (Step S6).

Figure 20:
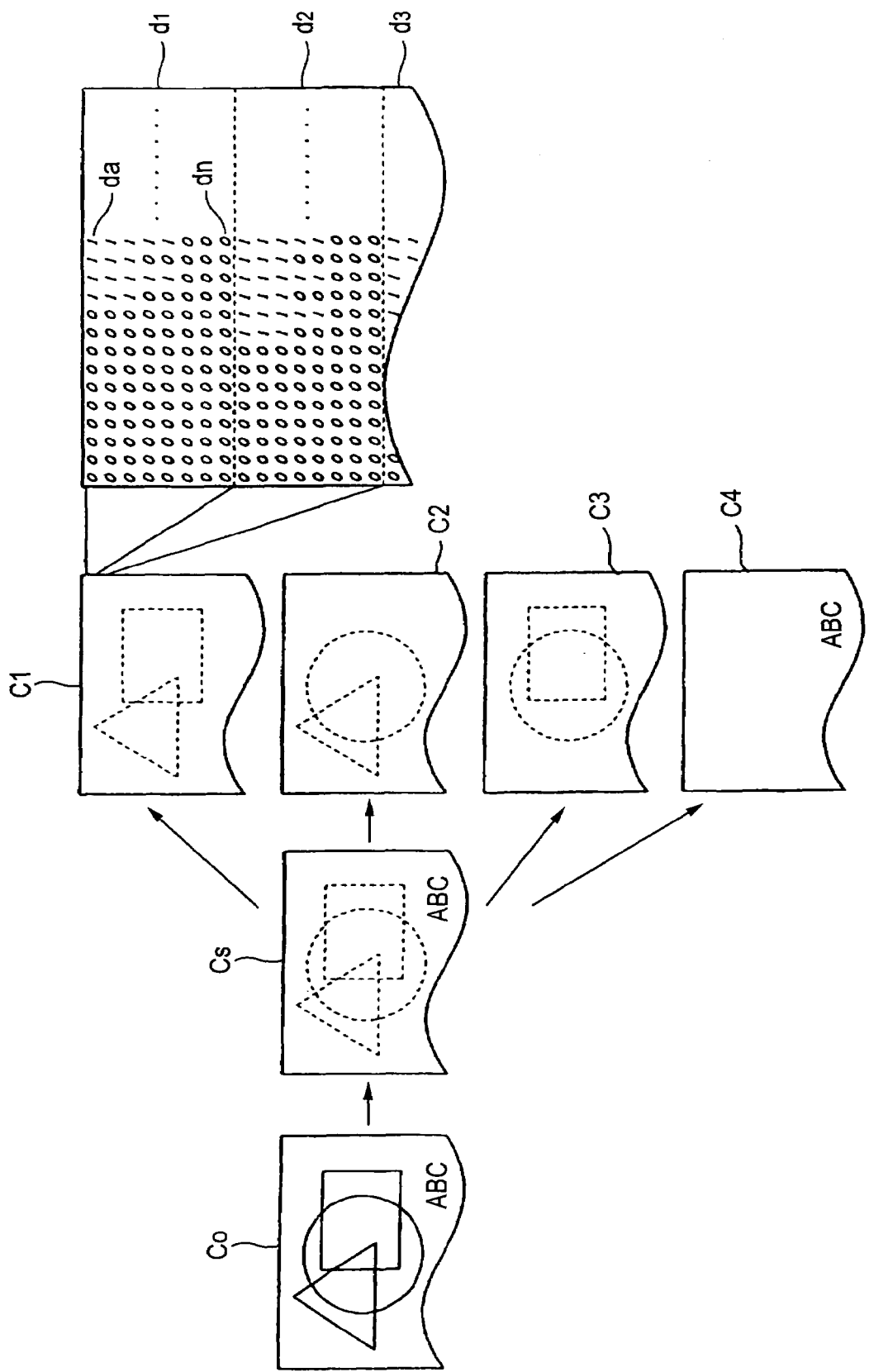
FIG. 20 is a diagram for understanding each of the steps in FIG. 19.

FIG. 20 visually shows the above data conversions. Original image data Co is transmitted from the host computer to the image forming apparatus. After the screening, image data Cs is obtained. After the color conversion, color separation data C1, C2, C3 and C4 corresponding to the respective image forming stations are obtained.

Here, the color separation data C1, C2, C3 and C4 indicate data set to image forming stations for yellow, magenta, cyan and black. The binary data shown in the right side of this figure is data to be transferred to the line head converted from the color separation data. Each of d1, d2, d3 . . . indicates data for one line of an image to be printed. For example, the data d1 for one image line is formed in rows "da" to "dn" which are sequentially transferred to the line head from an upper row, thereby controlling a time required for the light emission of each photo emitter.

Figure 21:
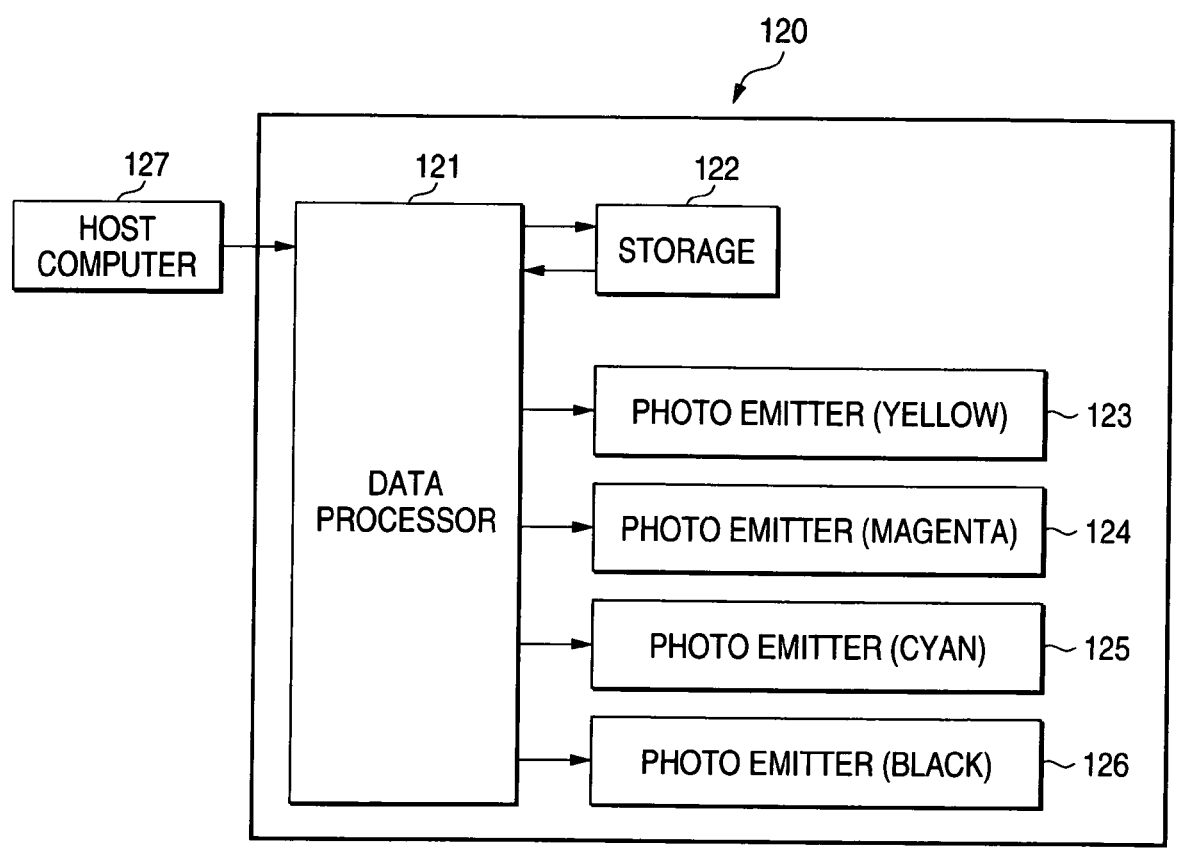
FIG. 21 is a block diagram of a controller for the line head of FIG. 16.

As shown in FIG. 21, a controller 120 provided in the image forming apparatus includes a storage 122 and a data processor 121 constituted by a CPU and an image processor. Moreover, the line head is provided with a photo emitter array 123 for yellow, a photo emitter array 124 for magenta, a photo emitter array 125 for cyan and a photo emitter array 126 for black.

The data processor 121 reads original image data transmitted from a host computer 127 to the image forming apparatus and stored in the storage 122 as described above, and carries out the processings described with reference to FIGS. 19 and 20. More specifically, the screening, the color conversion and the data conversion are carried out. Thus, the time data converted from the gray scale data as shown in FIG. 20 are supplied to the photo emitter arrays 123 to 126 for the respective colors, thereby carrying out the gradation control over the photo emitter.

Figure 22:
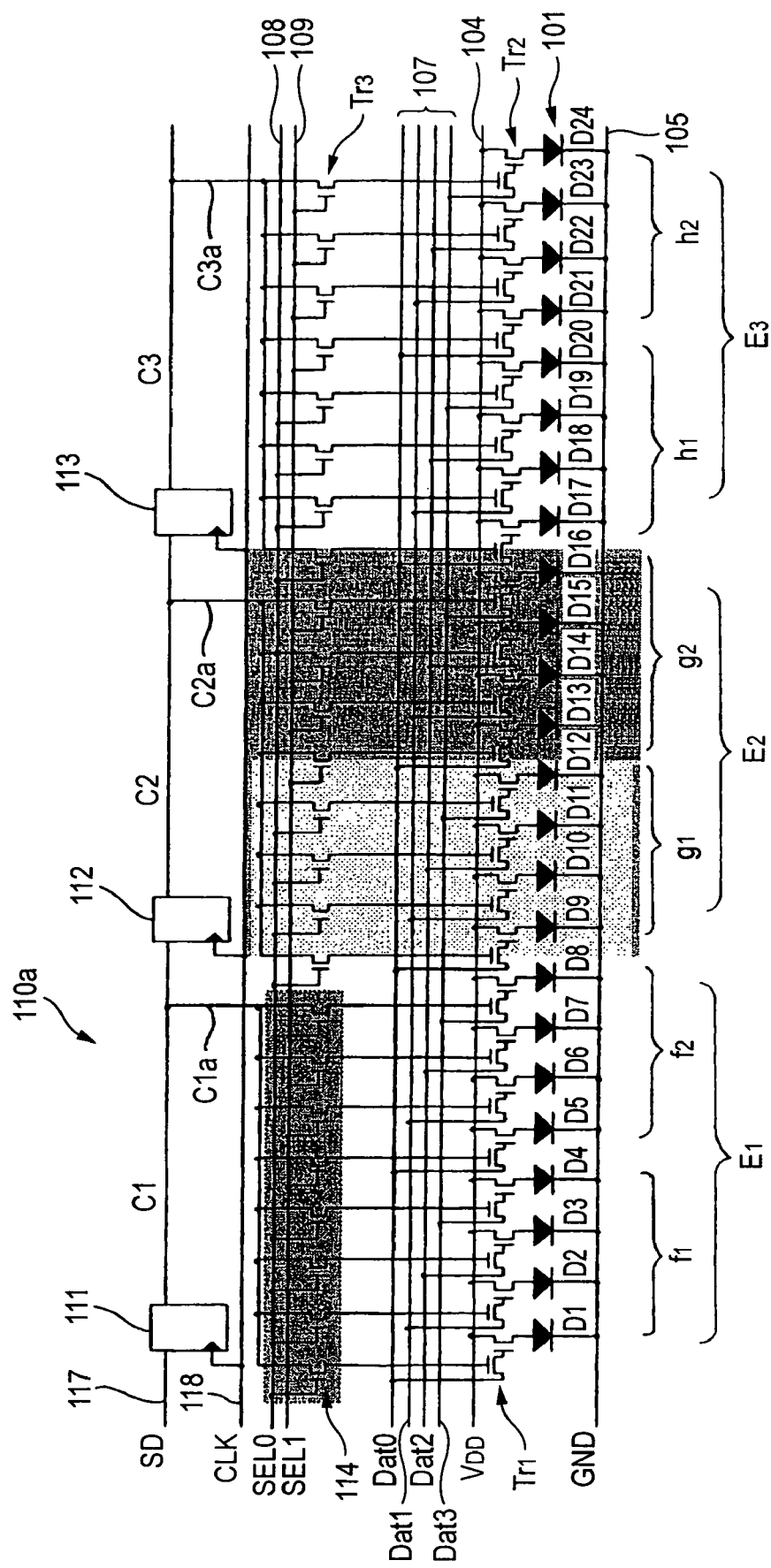
FIG. 22 is a circuit diagram of the line head of FIG. 16.

As shown in FIG. 22, a line head 110a is provided with the photo emitter array 101. The photo emitter array 101 is divided into the large groups E1 to E3, and each of the large groups is divided into the small groups of f1 and f2 . . . as shown in FIG. 16. Photo emitters D1 to D24 using the organic EL elements or LEDs are arranged in the photo emitter array 101, for example.

A positive voltage VDD is applied to a power line 104, and a negative voltage GND is applied to a power line 105. The positive power line 104 is connected to the anode of each of the photo emitters in the photo emitter array in common. Moreover, the negative power line 105 is connected to the cathode of each of the photo emitters in the photo emitter array 101. The photo emitters D0 to D24 in the photo emitter array 101 are connected in parallel between the power line 104 to which the positive voltage VDD is applied and the negative power line 105.

In FIG. 22, shift register circuits 111, 112, 113 for selecting the photo emitters D1 to D24 on a large group basis. SD denotes a start pulse to be input to the data terminal of the shift register circuit 111 through a signal line 117 for supplying data signals Dat0 to Dat3 to each of the photo emitters, and CLK denotes a clock signal to be input to each of the shift register circuits 111 to 113 through a signal line 118. Tr2 denotes a driver transistor connected to the anode side of each of the photo emitters, and Tr1 denotes a control transistor having a source connected to the gate of the drive transistor Tr2. The control transistor Tr1 and the drive transistor Tr2 are formed by an FET (Field Effect Transistor), for example.

A decoder 114 is provided with a switch transistor Tr3 of the TFT serving as a small group selector for selecting one small group in the large group selected by the shift register circuits 111 to 113. Small group selecting signals SEL0 and SEL1 are input to signal lines 108 and 109 serving as external control lines. For this reason, it is possible to use an earlier clock signal than the clock signal CLK to be supplied to the shift register circuits 111 to 113, for example. The signal line 108 is connected to the gate of each switch transistor Tr3 provided in one of the small groups in the large group. Moreover, the signal line 109 is connected to the gate of the switch transistor Tr3 provided in the other small group in the large group.

The switch transistors Tr3 provided in the decoder 114 have drains connected to the signal lines C1a to C3a to which the output signals of the shift register circuits 111 to 113 are supplied. Moreover, each source is connected to the gate of each control transistor Tr1. In the example of FIG. 22, a start signal is input to the shift register circuit 111 and a transfer to the shift register circuit is successively carried out through the clock signal (CLK), thereby sequentially selecting each of the large groups E1 to E3. In a case where the switch transistor Tr3 of the decoder 114 is formed on the same substrate as the photo emitter by using the TFT, the space of the line head can be utilized effectively so that the structure of the line head can be simplified.

A signal C1 sent from the output terminal of the shift register circuit 111 is supplied to the switch transistor Tr3 of the decoder 114 through the signal line C1a, thereby selecting the large group E1. Similarly, a signal C2 sent from the output terminal of the shift register circuit 112 selects the large group E2 through the decoder 114, and a signal C3 sent from the output terminal of the shift register circuit 113 selects the large group E3 through the decoder 114. More specifically, the shift register circuits 111 to 113 serve as a large group selector for the photo emitters arranged in the photo emitter array.

As described the above, the decoder 114 serves as the small group selector. Here, a signal having a high operating speed is generated on the outside of the line head and is thus supplied to the decoder 114. Therefore, it is possible to rapidly carry out an operation for activating the photo emitters in the small group which is selected.

In FIG. 22, when the output signals C1 to C3 of the shift register circuits 111 to 113 have an H level respectively, the small group selecting signal SEL0 or SEL1 is set to have the H level. At this time, the data signals Dat0 to Dat3 of the data line 107 are applied to the gate of each of the control transistors Tr1 for controlling the photo emitters in the small group. According to the usage of the shift register circuits, it is possible to select the large group with a simple structure for pulse driving.

Next, description will be given to the data signals Dat0 to Dat3 of the data line 107. The data signals are supplied to the drain of each of the control transistors Tr1. When the data signals Dat0 to Dat3 are supplied to the control transistors Tr1 of the photo emitters selected in response to the large group selecting signal and the small group selecting signal, accordingly, the drive transistors Tr2 connected to the control transistors Tr1 are conducted so that the corresponding photo emitter is operated.

For example, referring to the small group f1 in the large group E1, the data signals Dat0 to Dat3 are supplied to the control transistors Tr1 for controlling the photo emitters D1 to D4, respectively. More specifically, the data signal Dat0 to Dat3 act as selecting signals for selecting the individual photo emitters in the same small group. In this embodiment, it is possible to select the individual photo emitters in two stages of the large group and the small group, thereby carrying out the light emission. Referring to the data signals Dat0 to Dat3, the gray scale data are converted into the time data to be supplied to each of the photo emitters as described above. For this reason, the gradation control can be carried out so that various images can be formed. The photo emitters are individually controlled in the ON/OFF operation by the control transistors Tr1, and a time required for light emission can be set arbitrarily.

Figure 23:
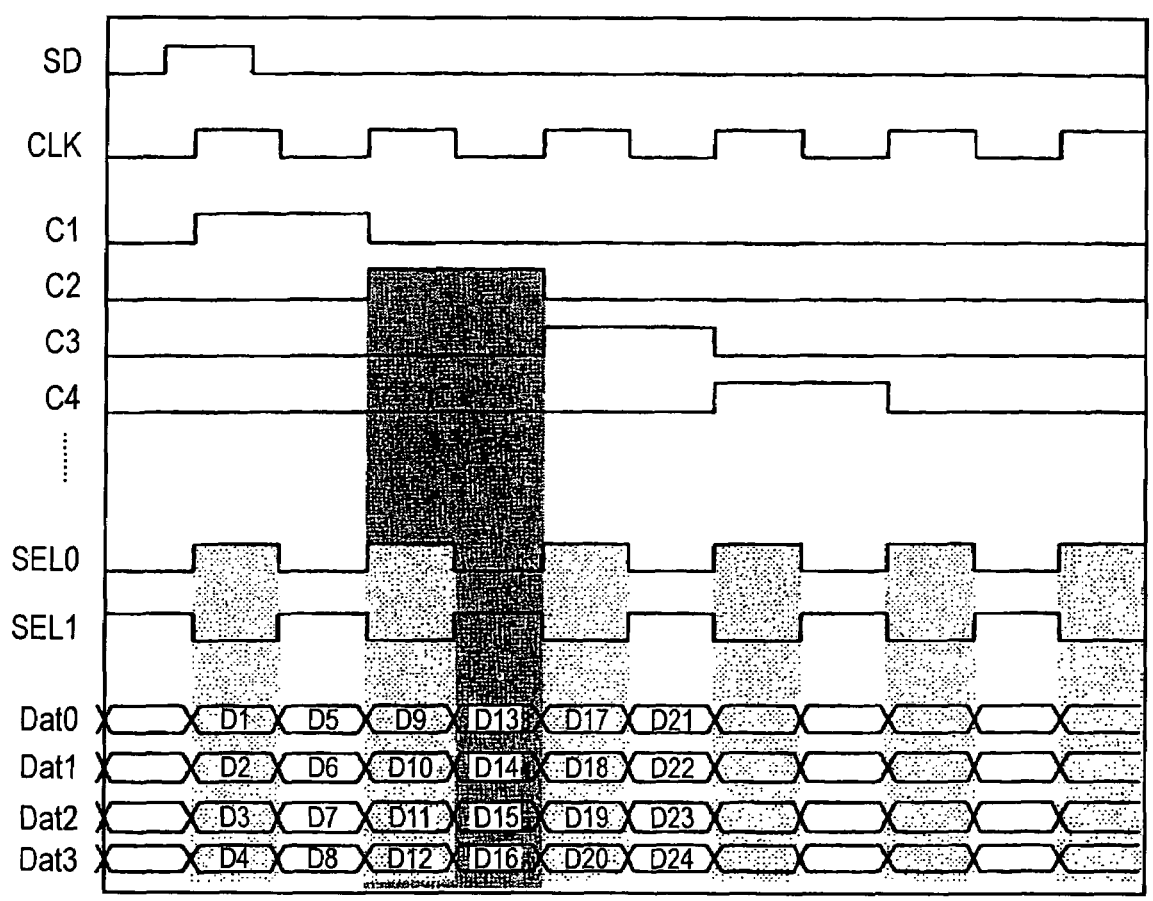
FIG. 23 is a time chart showing how to control the line head of FIG. 16.

Next, the specific operation of each of the photo emitters shown in FIG. 22 will be described with reference to a timing chart in FIG. 23. It is assumed that a DC voltage is applied to the positive and negative power lines 104 and 105 connected to each of the photo emitters in FIG. 22. In the serial shift register circuits indicated as 111 to 113 shown in FIG. 22, the start pulse SD is input to the data terminal of the shift register circuit 111 of the left end. Subsequently, the clock pulse CLK is input to each of the shift register circuits 111 to 113.

In a timing in which the clock pulse CLK is set to have the H level, the large group selecting signals C1, C2 . . . are set to have the H level. In a timing in which the large group selecting signals C1, C2 . . . are set to have the H level, moreover, one of the small group selecting signals, for example, SEL0 is set to have the H level. In this case, the other small group selecting signal SEL1 has an L level. When the small group selecting signal SEL0 is inverted from the H level to the L level, the other small group selecting signal SEL1 is inverted from the L level to the H level.

The ON data (data signals) Dat0 to Dat3 of each of the photo emitters are supplied synchronously with the inversion timing of the H level and the L level of the small group selecting signal SEL0 or SEL1. In the example of FIG. 23, when the large group signal C1 is output and the small group selecting signal SEL0 has the H level, the photo emitters D1 to D4 are turned on based on the ON data Dat1 to Dat3. When the large group signal C1 is output and the small group selecting signal SEL1 has the H level, moreover, the photo emitters D5 to D8 are turned on based on the ON data Dat1 to Dat3. FIG. 23 shows an example in which the photo emitters D9 to D12 are turned on when the large group signal C2 is output and the small group selecting signal SEL0 has the H level.

In the invention, thus, the small group selecting signals SEL0 and SEL1 are supplied from the two signal lines. Therefore, it is possible to reduce the number of the data lines for the photo emitters in each of the large groups. For instance, the data lines for the photo emitters in each of the large groups are originally required for eight photo emitters respectively in the example of FIG. 22. Consequently, eight data lines are required. On the other hand, in this embodiment, four data lines are provided and the number is therefore reduced to be a half. In a case where the number of the photo emitters in each of the large groups is increased, for example, 100 photo emitters are arranged, 50 data lines are enough according to the structure of the invention. More specifically, it is sufficient that a half number of data lines are wired corresponding to the number of the photo emitters arranged in the large group. Therefore, it is possible to considerably decrease the number of wirings.

Figure 24:
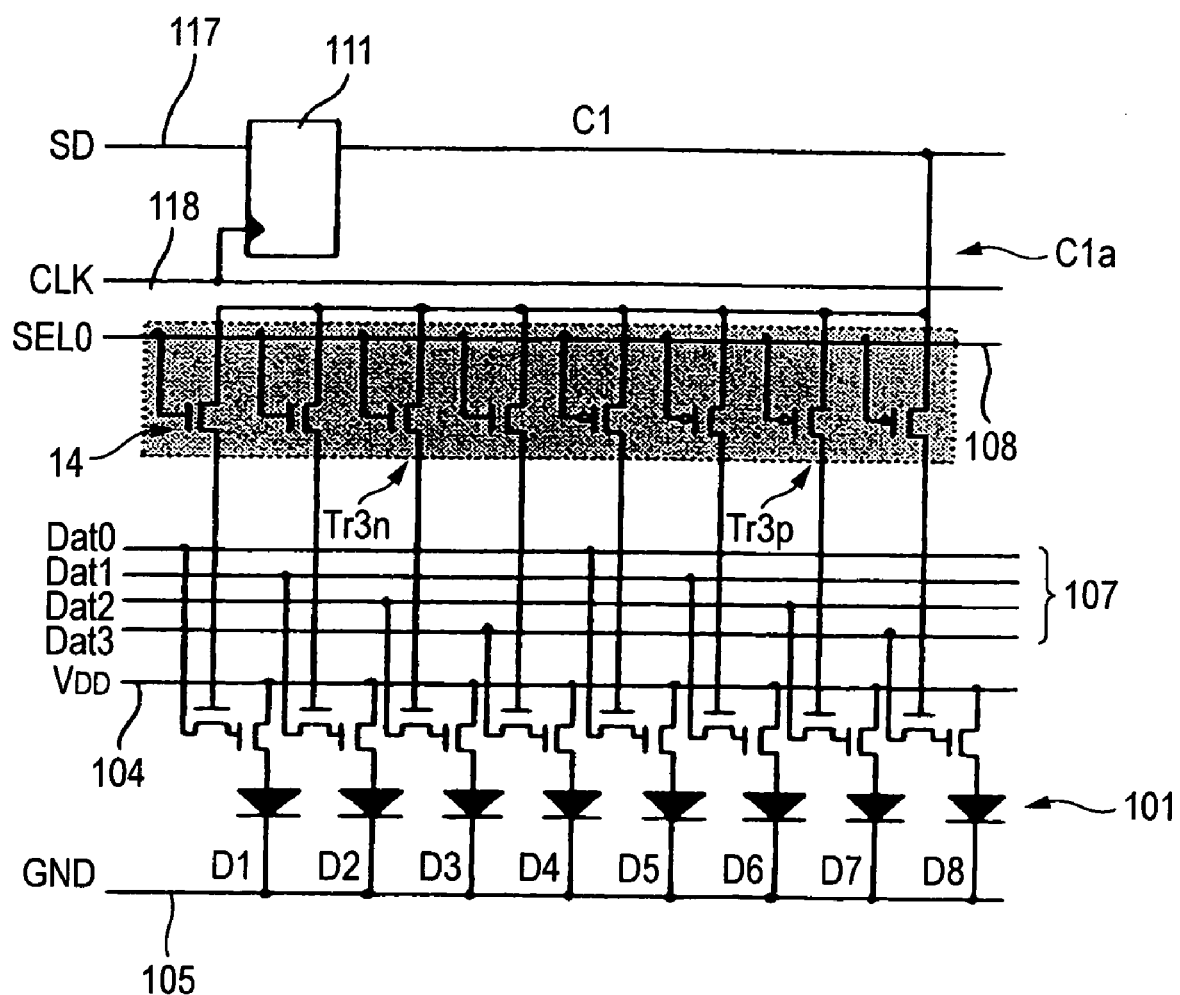
FIG. 24 is a circuit diagram of a line head according to a thirteenth embodiment of the invention.

FIG. 24 shows a thirteenth embodiment of the invention. Components similar to those in the twelfth embodiment will be designated by the same reference characters. In this embodiment, the structure of a circuit is devised so that the number of signal lines for supplying a small group selecting signal is decreased to one. Here, a switch transistor Tr3n for selecting small groups in a left half in the drawing of a decoder 114 is formed by an N-channel transistor, and a switch transistor Tr3p for selecting small groups in a right half is formed by a P-channel transistor. For this reason, both of the small groups can be selected complimentarily in response to only a signal SEL0 supplied through a signal line 108.

In the invention, the number of the small groups in each large group does not need to be two but a structure can be obtained in an arbitrary number. In the example of FIG. 16, when the large group is formed by 12 photo emitters and three photo emitters are arranged in each of the small groups, the number of the small groups in the large group becomes four. In this case, the number of the signal lines for supplying the small group selecting signal becomes four. When a certain small group selecting signal has an H level, three other small group selecting signals are set to have an L level. When the small group selecting signals of the four signal lines are sequentially set to have the H level, it is possible to select four small groups in the large group which is selected.

Since the number of the photo emitters in the small group is three, three data lines are wired to each of the photo emitters. Accordingly, the number of wirings required for turning on each of the photo emitters in the large group is seven. As compared with a structure in which 12 wirings are required for turning on each of the photo emitters in the large group, therefore, it is possible to decrease the number of the wirings also in this example.

Figure 25:
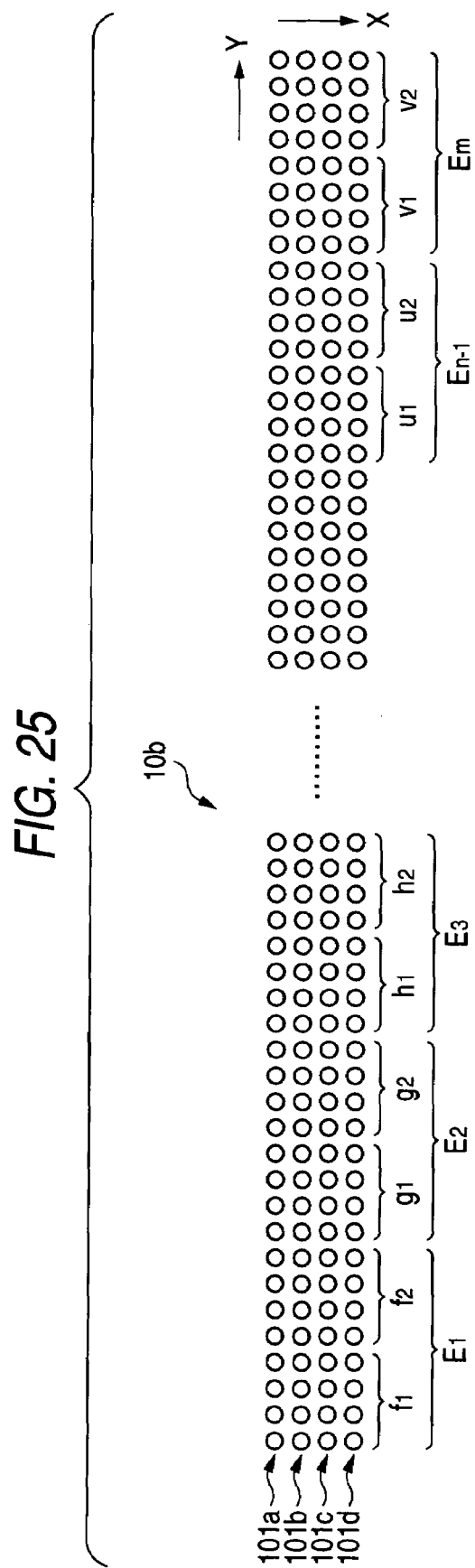
FIG. 25 is a diagram of a line head according to a fourteenth embodiment of the invention.

FIG. 25 shows a fourteenth embodiment of the invention. In this embodiment, a plurality of photo emitter arrays 101a to 101d are arrayed in a line head 110b corresponding to each color, respectively. The photo emitter arrays 101b to 101d are previously formed as preliminary lines. More specifically, the photo emitter array 101b is formed as a photo emitter array for a preliminary operation and is not usually used. In a case where any of photo emitters Ea of the photo emitter array 101a for a normal operation which is to be used in a normal printing processing has a failure, the photo emitter array 101b for the preliminary operation is used by changeover means which will be described below in detail. The photo emitter arrays 101c and 101d can be used when a multiple exposure is to be carried out, for example.

Variations can be obtained as described with reference to the seventh embodiment (FIG. 9).

Figure 26:
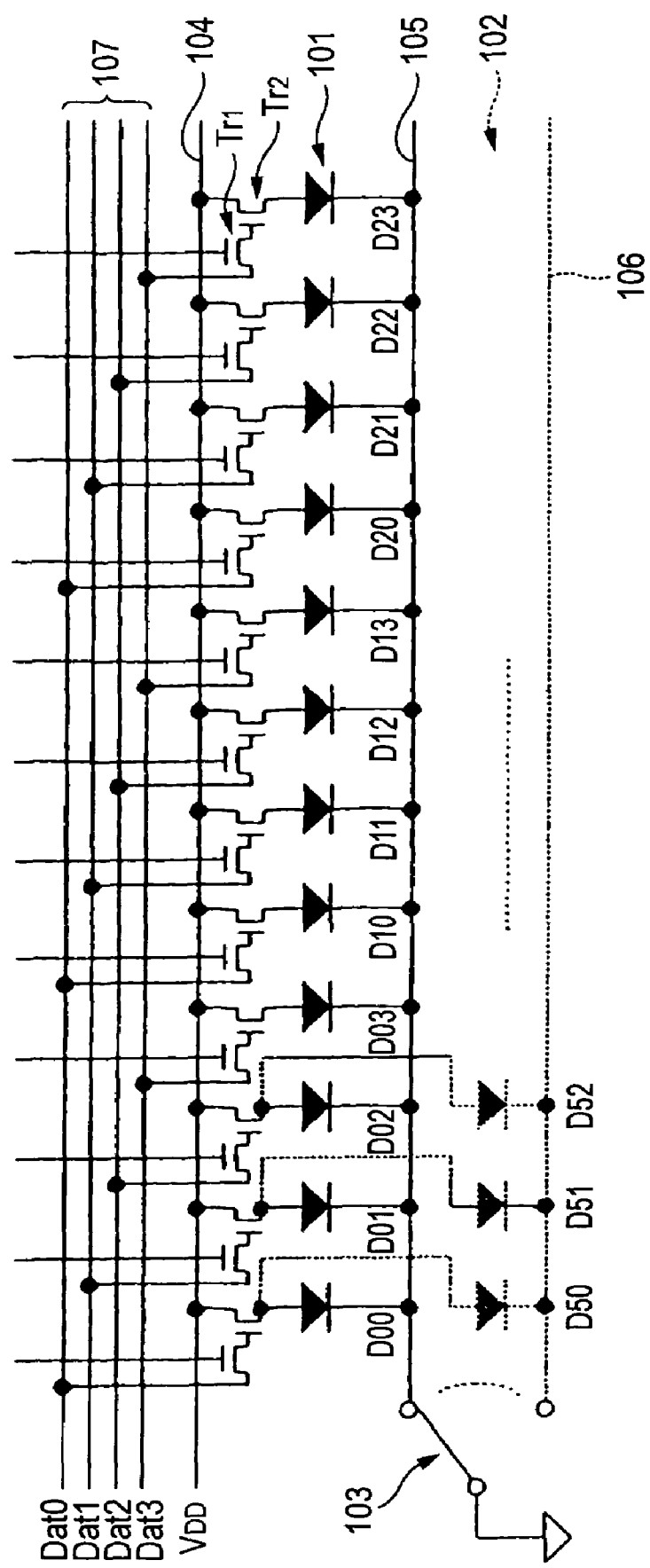
FIG. 26 is a circuit diagram of a line head according to a fifteenth embodiment of the invention.

FIG. 26 shows a fourteenth embodiment of the invention. In this embodiment, photo emitter arrays 101 and 102 are changed over by a switch 103 to be operable. In the example of FIG. 26, the changeover is carried out on negative power line 105 and 106 sides connected to the photo emitters of the photo emitter arrays 101 and 102, that is, the cathode side of the photo emitter.

The photo emitters of the photo emitter arrays 101 and 102 are divided into large groups, and each of the large groups is divided into small groups as shown in FIG. 16. Here, shift register circuits 111 to 113 for selecting the large groups can be formed on the same substrate together with the photo emitter arrays 101 and 102, a control transistor Tr1 and a drive transistor Tr2. In this case, the line head can be constituted to be small-sized.

Figure 27:
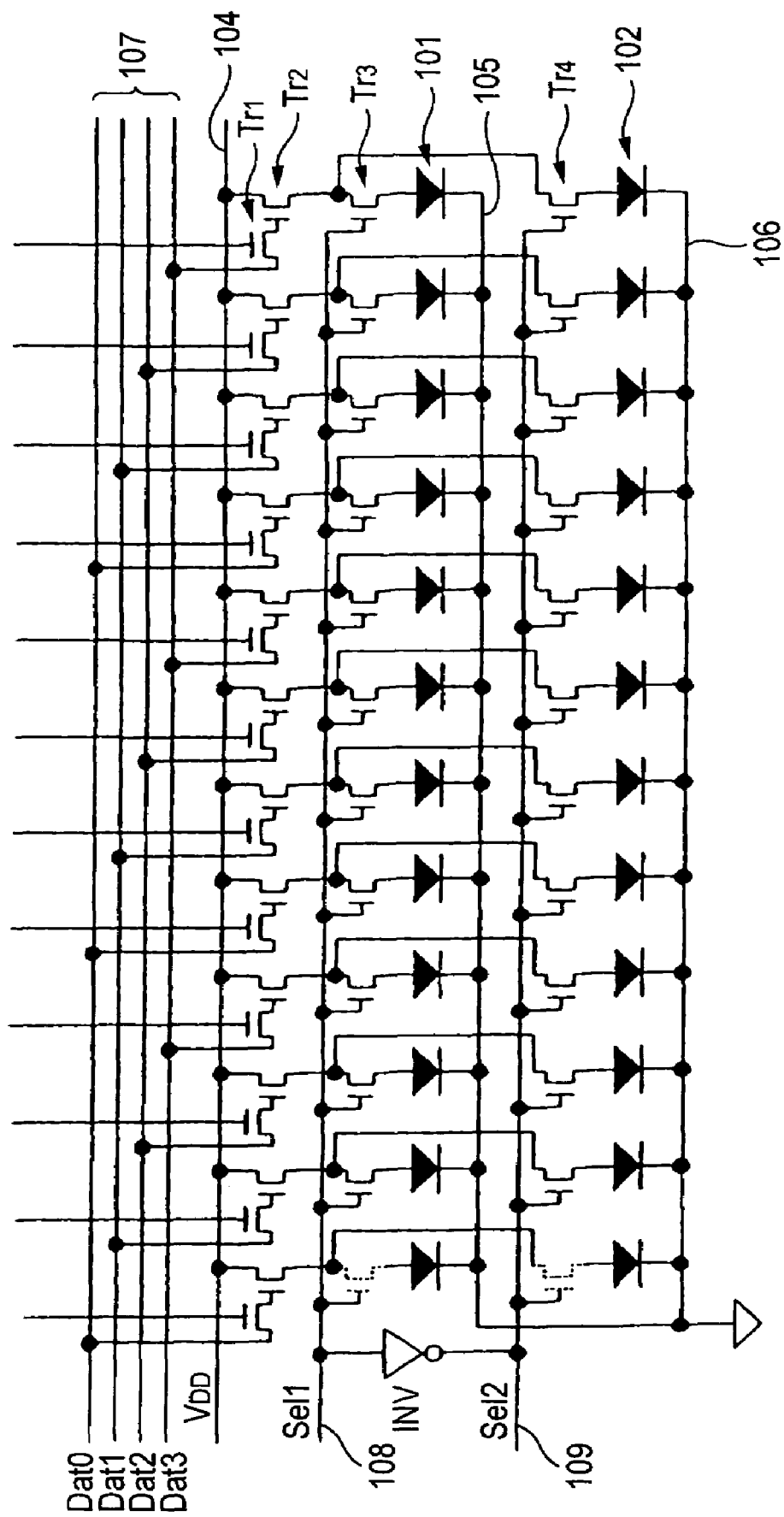
FIG. 27 is a circuit diagram of a line head according to a sixteenth embodiment of the invention.

FIG. 27 shows a fifteenth embodiment of the invention. Also in this embodiment, photo emitters in each of photo emitter arrays 101 and 102 are divided into large groups and each of the large groups is divided into small groups in the same manner as in FIG. 26. Here, transistors Tr3 and Tr4 change over the photo emitter arrays which are connected in series to a common drive transistor Tr2 to the photo emitter arrays 101 and 102. Select signals Sel1 and Sel2 of the photo emitter arrays are supplied to signal lines to which 108 and 109. An inverter INV outputs the select signal Sel2 obtained by inverting the select signal Sel1 and supplies the select signal Sel2 to the signal line 109. The select signal Sel2 obtained by inverting the select signal Sel1 may also be externally supplied. In this case, the inverter is not required.

In this embodiment, a positive power line 104 is connected in common to the anode of each of the photo emitters in the photo emitter arrays 101 and 102. Moreover, a negative power line 105 is connected to the cathode of each of the photo emitters in the photo emitter array 101 and a negative power line 106 is connected to the cathode of each of the photo emitters in the photo emitter array 102. Each of the photo emitters maintains the state of a connection to the negative power lines 105 and 106 at a common electric potential.

When the select signal Sel1 is supplied from the signal line 108 to the gate of the transistor Tr3 for changeover in order to change over the photo emitter array, each of the photo emitters of the photo emitter array 101 is turned on. In this case, the select signal Sel2 is not supplied from the signal line 109. Therefore, the photo emitters in the photo emitter array 102 are not turned on. When the select signal Sel1 of the signal line 108 is stopped and the select signal Sel2 is supplied from the signal line 109, the photo emitters in the photo emitter array 101 are turned off and the photo emitters in the photo emitter array 102 are turned on.

In this embodiment, the transistors Tr3 and Tr4 are operated to carry out the changeover control on the anode side of each of the photo emitter arrays 101 and 102. More specifically, the transistors Tr3 and Tr4 to which the select signals Sel1 and Sel2 are supplied for changing over the photo emitter array. The select signal Sel2 can also be formed as the inverted signal of the select signal Sel1.

Accordingly, it is possible to rapidly carry out the changeover operation, and furthermore, to enhance the reliability of the changeover of the photo emitter array more greatly as compared with a mechanical switch. In a case where the photo emitter is formed by an organic EL element and the transistors Tr3 and Tr4 for changeover are formed by a TFT (Thin Film Transistor), the transistor for changeover and the photo emitter can be fabricated on the line head by using the same manufacturing technique. Consequently, a manufacturing cost can be reduced.

Figure 28:
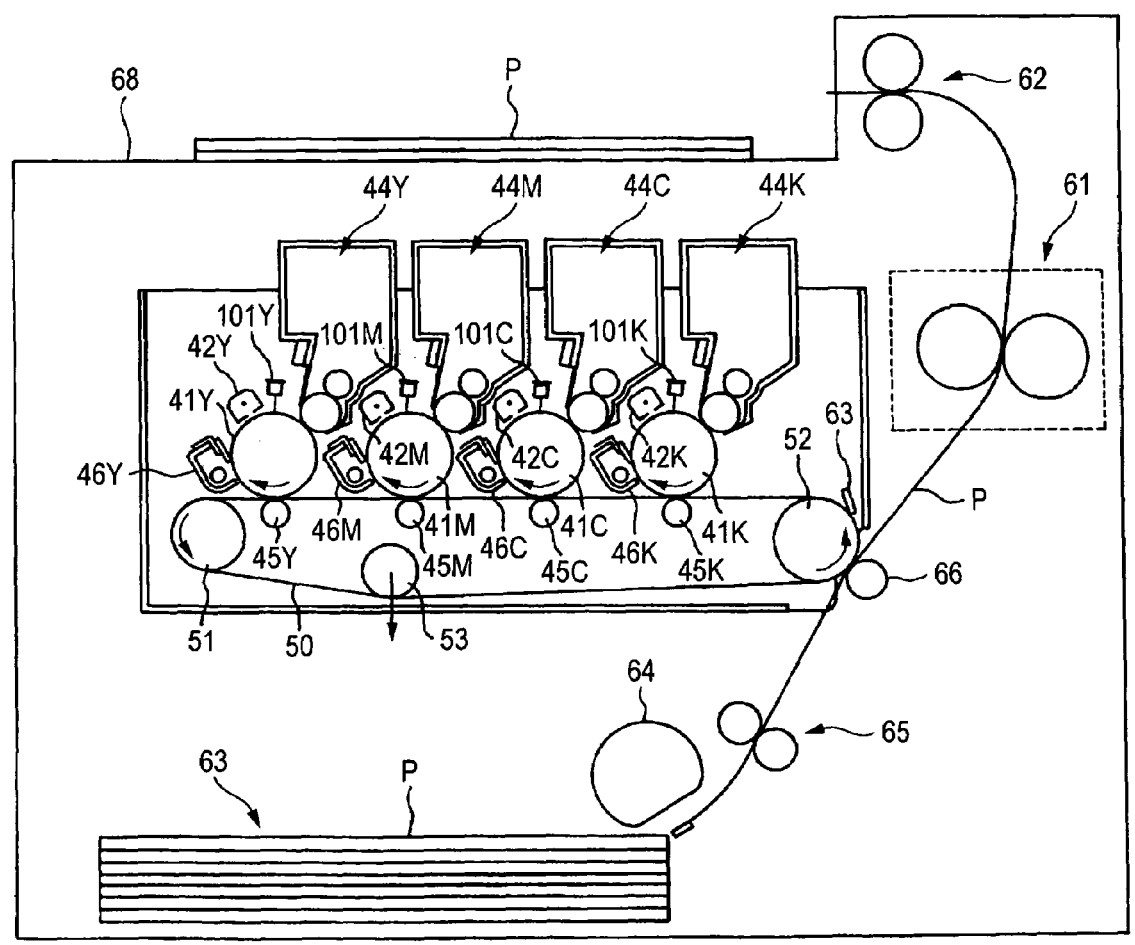
FIG. 28 is a schematic section view of a first example of an image forming apparatus incorporating the line head of the invention.

FIG. 28 shows a tandem type image forming apparatus incorporating the line head according to the above embodiments. The image forming apparatus includes four line heads 101K, 101C, 101M and 101Y using having the same structure which are provided in the exposers of four corresponding photosensitive drums (image carriers) 41K, 41C, 41M and 41Y having the same structure respectively.

The image forming apparatus is provided with a driving roller 51, a follower roller 52 and a tension roller 53, and includes an intermediate transfer belt 50 to be stretched with the application of a tension through the tension roller 53 and circulated in a direction of an arrow shown in the drawing (a counterclockwise direction). The photosensitive drums 41K, 41C, 41M and 41Y having photosensitive layers on the outer peripheral surfaces are provided as four image carriers disposed at a predetermined interval with respect to the intermediate transfer belt 50.

K, C, M and Y added after the reference numerals represent black, cyan, magenta and yellow respectively, and indicate photosensitive members for black, cyan, magenta and yellow respectively. Other members are shown in the same manner. The photosensitive drums 41K, 41C, 41M and 41Y are rotated in a direction of an arrow shown in the drawing (a clockwise direction) synchronously with the circulation of the intermediate transfer belt 50.

Chargers (corona chargers) 42 (K, C, M and Y) for uniformly charging the outer peripheral surfaces of the photosensitive drums 41 (K, C, M and Y) respectively and the line heads 101 (K, C, M and Y) according to the invention which serve to sequentially scan the outer peripheral surfaces charged uniformly by the chargers 42 (K, C, M and Y) synchronously with the rotation of the photosensitive drums 41 (K, C, M and Y) are provided around the photosensitive drums 41 (K, C, M and Y).

Moreover, there are provided developing devices 44 (K, C, M and Y) for applying a toner serving as a developer onto electrostatic latent images formed by the line heads 101 (K, C, M and Y) so as to be visible images (toner images), primary transfer rollers 45 (K, C, M and Y) for sequentially transferring the toner images developed by the developing devices 44 (K, C, M and Y) onto the intermediate transfer belt 50 serving as a primary transfer object, and cleaning devices 46 (K, C, M and Y) for removing the toner remaining on the surfaces of the photosensitive drums 41 (K, C, M and Y) after the primary transfer.

The line heads 101 (K, C, M and Y) are provided in such a manner that the direction of the array of the line heads 101 (K, C, M and Y) is set along the axes of the photosensitive drums 41 (K, C, M and Y). The energy peak wavelength of emitted light of each of the line heads 101 (K, C, M and Y) and the peak of sensitive wavelength of each of the photosensitive drums 41 (K, C, M and Y) are set to be almost coincident with each other.

The developing devices 44 (K, C, M and Y) use a non-magnetic single-component toner as the developer, for example, and serve to deliver the single-component developer to a developing roller through a feed roller, for example, and to regulate the thickness of the film of the developer stuck to the surface of the developing roller through a control blade and to cause the developing roller to come in contact with or to press the developing roller against the photosensitive drums 41 (K, C, M and Y), thereby sticking the developer depending on the electric potential level of the photosensitive drums 41 (K, C, M and Y) to develop toner images.

The black, cyan, magenta and yellow toner images formed by single-color toner image forming stations having four colors are primarily transferred sequentially onto the intermediate transfer belt 50 with a primary transfer bias to be applied to the primary transfer rollers 45 (K, C, M and Y), and are sequentially superposed on each other over the intermediate transfer belt 50 to have full colors. The toner images thus obtained are secondarily transferred onto a recording medium P such as paper by a secondary transfer roller 66, and pass through a fixing roller pair 61 to be a fixing portion and are thus fixed onto the recording medium P, and the recording medium P is ejected, through an ejection roller pair 62, onto an ejection tray 68 formed in the upper part of the apparatus.

In a cassette 63, a large number of recording media P are accommodated, and a pick-up roller 64 feeds the recording media P one by one from the cassette 63 to a gate roller pair 65 for specifying the feed timing of the recording medium P to the secondary transfer position formed by the secondary transfer roller 66 and the intermediate transfer belt 50. A cleaning blade 67 removes the toner remaining on the surface of the intermediate transfer belt 50 after the secondary transfer.

Since the image forming apparatus incorporates the line heads as an image writer, the size of the apparatus can be reduced in comparison with a case where a laser scanning optical system is used.

Figure 29:
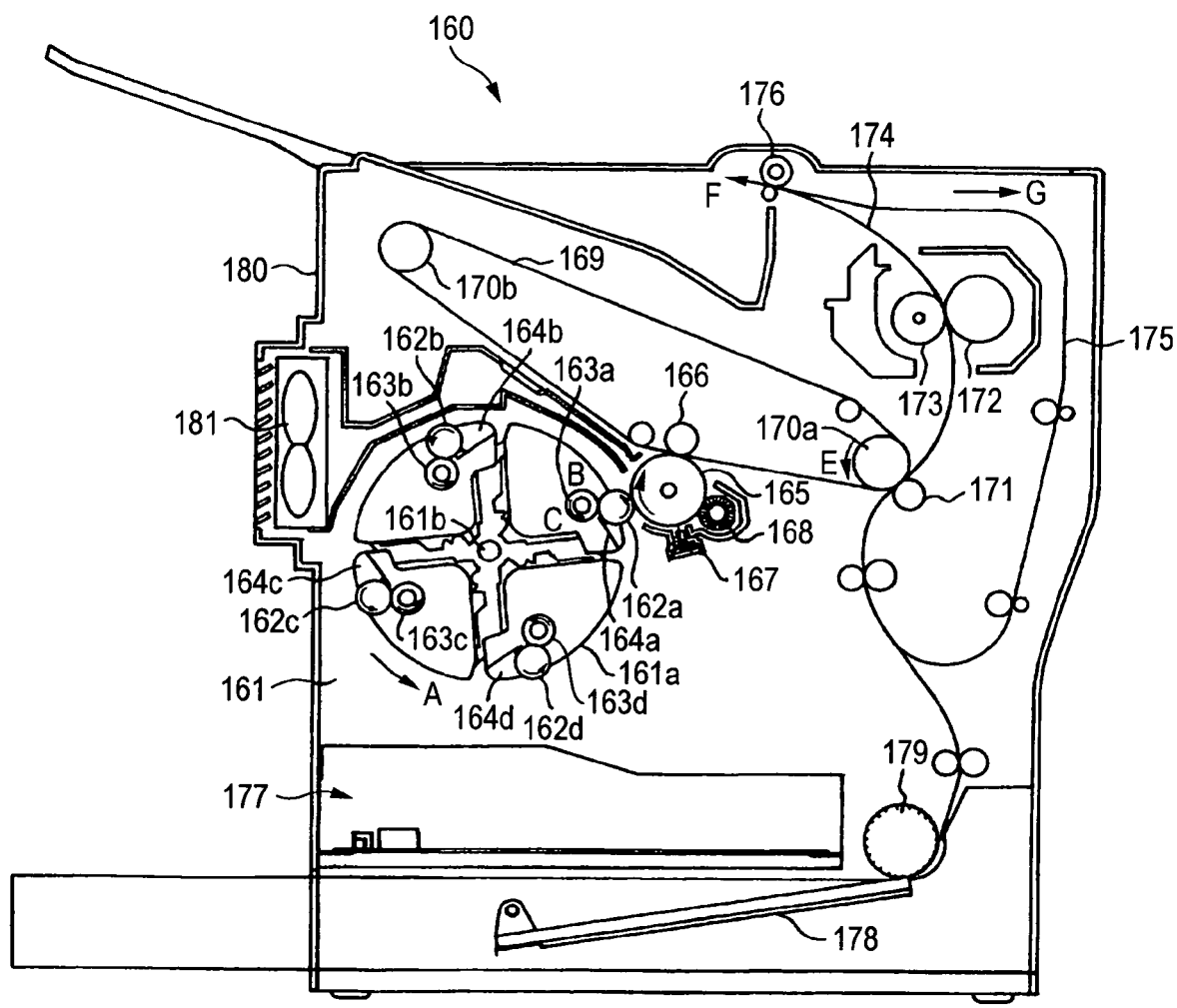
FIG. 29 is a schematic section view of a second example of an image forming apparatus incorporating the line head of the invention.

FIG. 29 shows a four-cycle type image forming apparatus 160 comprises, as main components, a developing device 161 having a rotary structure, a photosensitive drum 165 serving as an image carrier, a line head 167 provided with an organic EL element array, an intermediate transfer belt 169, a delivery path 174, a heating roller 172 of a fuser, and a feeding tray 178.

In the developing device 161, a rotary 161*a* is rotated in a direction of an arrow A around a shaft 161*b*. The inner part of the rotary 161*a* is divided into four sections and image forming units having four colors of yellow (Y), cyan (C), magenta (M) and black (B) are provided therein, respectively. In the image forming units, there are provided developing rollers 162*a* to 162*d* to be rotated in a direction of an arrow B, toner feeding rollers 163*a* to 163*d* to be rotated in a direction of an arrow C, and control blades 164*a* to 164*d* for regulating the toner into a predetermined thickness.

The photosensitive drum 165 is rotated in a direction of an arrow D which is reverse to the developing roller 162*a* by a driving motor which is not shown, for example, a step motor.

The intermediate transfer belt 169 is stretched between a driving roller 170*a* and a follower roller 170*b*, and the driving roller 170*a* is coupled to the driving motor of the photosensitive drum 165 to transmit a power to the intermediate transfer belt 169. By the driving operation of the driving motor, the driving roller 170*a* of the intermediate transfer belt 169 is rotated in a direction of an arrow E which is reverse to the photosensitive drum 165.

The delivery path 174 is provided with a plurality of delivery rollers and an ejection roller pair 176, and serves to deliver a paper. An image (toner image) on either side which is carried by the intermediate transfer belt 169 is transferred onto either side of the paper at the position of a secondary transfer roller 171. The secondary transfer roller 171 separates from or abuts on the intermediate transfer belt 169 through a clutch, so that the image is secondarily transferred onto the paper at a predetermined timing.

Next, the paper onto which the image is transferred as described above is subjected to a fixing operation by the fuser having a heater H. The fuser unit is provided with the heating roller 172 and a pressure roller 173. The paper subjected to the fixing operation is drawn into the ejection roller pair 176 and proceeds in a direction of an arrow F. When the ejection roller pair 176 is rotated in a reverse direction in this state, the direction of the paper is inverted and the paper proceeds along a delivery path 175 for perfecting in a direction of an arrow G. In the lower section of the apparatus, there is provided an electrical equipment box 177, and a pick-up roller 179 is provided at the outlet of the feeding tray 178.

In the paper delivery path, a low-speed brushless motor is used for the driving motor for driving the delivery roller, for example. Since the intermediate transfer belt 169 requires a color deviation correction, a step motor is used. Each of the motors is controlled by a signal sent from a controller which is not shown.

An yellow (Y) electrostatic latent image is formed on the photosensitive drum 165 which has been uniformly charged by charger 168, and a high voltage is applied to the developing roller 162*a* in the state shown in the drawing, so that an yellow image is formed on the photosensitive drum 165. When all of yellow images on double sides are carried on the intermediate transfer belt 169, the rotary 161*a* is rotated at 90 degrees in the direction of the arrow A.

The intermediate transfer belt 169 carries out one rotation and returns to the position of the photosensitive drum 165. Next, cyan (C) images for two surfaces of the paper are formed on the photosensitive drum 165, and the images are superposed on the yellow images carried on the intermediate transfer belt 169. In the same manner, subsequently, the rotation of the rotary 161 at 90 degrees and a one-rotation processing to be performed after carrying the image on the intermediate transfer belt 169 are repeated.

The intermediate transfer belt 169 is rotated four times in order to carry color images having four colors, and thereafter, a rotating position is further controlled so that the images are transferred onto the paper in the position of the secondary transfer roller 171. The paper fed from the feeding tray 178 is delivered along the delivery path 174 and the color images are transferred onto either side of the paper in the position of the secondary transfer roller 171. The paper having the images transferred onto the either side is inverted through the ejection roller pair 176 as described above and stands by in the delivery path 174. Then, the paper is delivered to the position of the secondary transfer roller 171 in a proper timing and the color images are transferred onto the other side. A housing 180 is provided with an exhaust fan 181.

The line head and the image forming apparatus using the line head according to the invention have been described above based on the examples. The invention is not restricted to the examples but various changes can be made.

What is claimed is:

1. A line head comprising:
   a first power line, adapted to be electrically connected to a power source;
   a second power line, adapted to be grounded; and
   a plurality of photo emitters, arrayed in a first direction, each of which is electrically connected between the first power line and the second power line by way of a connection line,
   wherein the photo emitters includes at least one photo emitter provided with a connection line having a resistance different from another, and
   wherein the connection line having the different resistance is formed with a cutout portion.

2. The line head as set forth in claim 1, wherein:
   the connection line includes a transparent electrode which is to be opposed to a target to which a light beam emitted from each of the photo emitters is directed; and
   the cut out portion is formed on the transparent electrode.

3. The line head as set forth in claim 2, wherein the cutout portion is rectangular in which each of sides has a dimension which is a multiple of a reference dimension.

4. The line head as set forth in claim 1, wherein the photo emitters form a plurality of groups, and photo emitters belonging to each of the groups are collectively connected to the connection line.

5. A method of fabricating the line head as set forth in claim 4, comprising steps of:
- operating the photo emitters before the cutout portion is formed;
- identifying a group including photo emitters which emit light beams having a lowest luminance; and
- forming the cutout portion such a size that the resistance of the connection line of interest matches with the resistance of the connection line of the identified photo emitter.

6. A method of fabricating the line head as set forth in claim 1, comprising steps of:
- operating the photo emitters before the cutout portion is formed;
- identifying a photo emitter which emits a light beam having a lowest luminance; and
- forming the cutout portion such a size that the resistance of the connection line of interest matches with the resistance of the connection line of the identified photo emitter.

7. A line head comprising:
- a first power line, adapted to be electrically connected to a power source;
- a second power line, adapted to be grounded; and
- a plurality of photo emitters, arrayed in a first direction, each of which is electrically connected between the first power line and the second power line by way of a connection line,
- wherein the photo emitters includes at least one photo emitter provided with a connection line having a resistance different from another, and
- wherein the connection line having the different resistance has a different width.

8. The line head as set forth in claim 7, wherein the photo emitters form
- a plurality of groups, and photo emitters belonging to each of the groups are collectively connected to the connection line.

9. A line head comprising:
- a first power line, adapted to be electrically connected to a power source;
- a second power line, adapted to be grounded;
- a plurality of photo emitters, arrayed in a first direction, each of which is electrically connected between the first power line and the second power line by way of a connection line,
- wherein the photo emitters includes at least one photo emitter provided with a connection line having a resistance different from another;
- a first substrate, on which the photo emitters, the first power line and the second power line are provided; and
- a second substrate, on which a first auxiliary power line and a second auxiliary power line are provided, the second substrate disposed so as to oppose to the first substrate, wherein
- the first power line and the first auxiliary power line are electrically connected; and
- the second power line and the second auxiliary power line are electrically connected.

* * * * *